US 10,558,595 B2

(12) United States Patent
Wilkinson et al.

(10) Patent No.: US 10,558,595 B2
(45) Date of Patent: Feb. 11, 2020

(54) SENDING DATA OFF-CHIP

(71) Applicant: Graphcore Limited, Bristol (GB)

(72) Inventors: Daniel John Pelham Wilkinson, West Harptree (GB); Richard Luke Southwell Osborne, Bristol (GB); Stephen Felix, Bristol (GB); Graham Bernard Cunningham, Wiltshire (GB); Alan Graham Alexander, Wotton-Under-Edge (GB)

(73) Assignee: Graphcore Limited, Bristol (GB)

( * ) Notice: Subject to any disclaimer, the term of this patent is extended or adjusted under 35 U.S.C. 154(b) by 0 days.

(21) Appl. No.: 16/165,607

(22) Filed: Oct. 19, 2018

(65) Prior Publication Data

US 2019/0155768 A1    May 23, 2019

(30) Foreign Application Priority Data

Oct. 20, 2017  (GB) .................................. 1717293.3
Oct. 20, 2017  (GB) .................................. 1717294.1
Oct. 17, 2018  (GB) .................................. 1816930.0

(51) Int. Cl.
*G06F 13/20*      (2006.01)
*G06F 13/42*      (2006.01)
(Continued)

(52) U.S. Cl.
CPC .......... *G06F 13/20* (2013.01); *G06F 13/4221* (2013.01); *G06F 13/4282* (2013.01);
(Continued)

(58) Field of Classification Search
CPC .. G06F 13/20; G06F 13/4221; G06F 13/4282; G06F 2213/0024;
(Continued)

(56) References Cited

U.S. PATENT DOCUMENTS 5,928,351 A    7/1999   Horie
7,636,835 B1  12/2009   Ramey et al.
(Continued)

FOREIGN PATENT DOCUMENTS

CN    101586961 A    11/2009
CN    102132249 A     7/2011
(Continued)

OTHER PUBLICATIONS

Search Report for Taiwan Patent Application No. 107136871 dated Jul. 4, 2019.
(Continued)

*Primary Examiner* — Idriss N Alrobaye
*Assistant Examiner* — Ronald T Modo
(74) *Attorney, Agent, or Firm* — Haynes and Boone, LLP

(57) ABSTRACT

A processor comprising multiple tiles on the same chip, and an external interconnect for communicating data off-chip in the form of packets. The external interconnect comprises an external exchange block configured to provide flow control and queuing of the packets. One of the tiles is nominated by the compiler to send an external exchange request message to the exchange block on behalf of others with data to send externally. The exchange sends an exchange-on message to a first of these tiles, to cause the first tile to start sending packets via the external interconnect. Then, once this tile has sent its last data packet, the exchange block sends an exchange-off control packet to this tile to cause it to stop sending packets, and sends another exchange-on message to the next tile with data to send, and so forth.

21 Claims, 18 Drawing Sheets

(51) Int. Cl.
  *G06F 15/16* (2006.01)
  *G06F 15/163* (2006.01)
(52) U.S. Cl.
  CPC ............... *G06F 2213/0024* (2013.01); *G06F 2213/0026* (2013.01)
(58) Field of Classification Search
  CPC .... G06F 2213/0026; G06F 9/00; G06F 15/16; G06F 15/163; G06F 13/40; G06F 13/14; G06F 9/54
  See application file for complete search history.

(56) References Cited

U.S. PATENT DOCUMENTS

| | | | |
|---|---|---|---|
| 7,861,060 | B1 | 12/2010 | Nickolls |
| 8,151,088 | B1 | 4/2012 | Bao et al. |
| 2004/0130552 | A1 | 7/2004 | Duluk |
| 2009/0064167 | A1 | 3/2009 | Arimilli |
| 2009/0177867 | A1 | 7/2009 | Garde |
| 2010/0115236 | A1 | 5/2010 | Bataineh |
| 2011/0173358 | A1* | 7/2011 | Ohmacht ............ G06F 13/4022 710/110 |
| 2012/0179896 | A1 | 7/2012 | Salapura |
| 2015/0143085 | A1 | 5/2015 | Khan |
| 2016/0342185 | A1 | 11/2016 | Rodriguez |
| 2017/0052876 | A1 | 2/2017 | Svensson |
| 2017/0199844 | A1 | 7/2017 | Burchard et al. |
| 2017/0220499 | A1 | 8/2017 | Gray |
| 2017/0277567 | A1 | 9/2017 | Lai |
| 2018/0205656 | A1* | 7/2018 | Atli .................... H04L 47/11 |
| 2019/0155768 | A1 | 5/2019 | Wilkinson |

FOREIGN PATENT DOCUMENTS

| | | |
|---|---|---|
| CN | 102782672 | 11/2012 |
| CN | 103108000 | 5/2013 |
| TW | 201510860 A | 3/2015 |
| WO | WO2009158690 | 12/2009 |
| WO | WO2017069900 | 4/2017 |

OTHER PUBLICATIONS

International Search Report and Written Opinion for International Application No. PCT/EP2018/077675 dated Jan. 18, 2019.
Gonzalez et al., Groups in Bulk Synchronous Parallel Computing. 8th Euromicro Workshop: Parallel and Distributed Processing. Jan. 19, 2000. p. 244-251.
Khunayn et al., Straggler Mitigation for Distributed Behavioral Simulation. 2017 IEEE 37th International Conference on Distributed Computing Systems. May 6, 2017. 4 pages.
Krstic et al., Globally Asynchronous, Locally Synchronous Circuits: Overview and Outlook. IEEE Design& Test of Computers. IEEE Service Center, New York, NY. 2007;24(5):430-441. doi: 10.1109/mdt.2007.164.
UK Search Report for Application No. GB 1717294.1 dated Apr. 26, 2019.
UK Combined Search and Examination Report for Application No. GB1717293.3 dated Apr. 16, 2019.
Cha et al., H-BSP: A Hierarchical BSP Computation Model. The Journal of Supercomputing, Feb. 2001;18(2):179-200.
Kapre et al., An NoC Traffic Compiler for Efficient FPGA Implementation of Sparse Graph-Oriented Workloads. International Journal of Reconfigurable Computing. vol. 2011 (2011), Article ID 745147. 15 pages.
Valiant, A bridging model for parallel computation. Communications of the ACM, Aug. 1990;33(8):103-11.
UK Search Report for Application No. GB 1816930.0 dated Apr. 24, 2019.
Office Action for TW Patent Application No. 107136465 dated Sep. 11, 2019.
Combined Search and Examination Report for United Kingdom Patent Application No. GB1821193.8 dated Jun. 12, 2019. 5 pages.
Anonymous: "Synchronization (computer science)—Wikipedia", Sep. 19, 2017 (Sep. 19, 2017), pp. 1-9, XP055566993, Retrieved from the Internet URL:https://en.wikipedia.org/w/index.php? title=Synchronization_(computer_science)&oldid=801376314 [retrieved on Mar. 11, 2019].
"PCI Express Base Specification Revision 3.0; Introduction and Physical Layer Specification", Nov. 10, 2010 (Nov. 10, 2010), pp. 37-412, XP055096393, Retrieved from the Internet: URL:http://komposter.com.ua/documents/PCI_Express_Base_Specification_Revision_3.0.pdf [retrieved on Jan. 14, 2014].
International Search Report and Written Opinion dated Aug. 20, 2019 for PCT Patent Application No. PCT/EP2019/067375.
Office Action for Taiwan patent application 10821013930 dated Oct. 28, 2019, 4 pages.
Office Action for Canadian patent application 3,021,409 dated Oct. 7, 2019, 3 pages

* cited by examiner

SENDING DATA OFF-CHIP

CROSS-REFERENCE TO RELATED APPLICATIONS

This application claims the priority benefit under 35 U.S.C. § 119 of United Kingdom Patent Application No. 1816930.0, filed Oct. 17, 2018, United Kingdom Patent Application No. 1717294.1, filed Oct. 20, 2017, and United Kingdom Patent Application No. 1717293.3, filed Oct. 20, 2017, the entire contents of which are incorporated herein by reference.

TECHNICAL FIELD

The present disclosure relates to a mechanism for sending data off-chip over an external interconnect from a processor comprising an arrangement of multiple tiles on the same chip (die), each tile comprising its own memory and processing unit.

BACKGROUND

A multi-threaded processor is a processor which is capable of executing multiple program threads alongside one another. The processor may comprise some hardware that is common to the multiple different threads (e.g. a common instruction memory, data memory and/or execution unit); but to support the multi-threading, the processor also comprises some dedicated hardware specific to each thread.

The dedicated hardware comprises at least a respective context register file for each of the number of threads that can be executed at once. A "context", when talking about multi-threaded processors, refers to the program state of a respective one of the threads being executed alongside one another (e.g. program counter value, status and current operand values). The context register file refers to the respective collection of registers for representing this program state of the respective thread. Registers in a register file are distinct from general purpose memory in that register addresses are fixed as bits in instruction words, whereas memory addresses can be computed by executing instructions. The registers of a given context typically comprise a respective program counter for the respective thread, and a respective set of operand registers for temporarily holding the data acted upon and output by the respective thread during the computations performed by that thread. Each context may also have a respective status register for storing a status of the respective thread (e.g. whether it is paused or running). Thus each of the currently running threads has its own separate program counter, and optionally operand registers and status register(s).

One possible form of multi-threading is parallelism. That is, as well as multiple contexts, multiple execution pipelines are provided: i.e. a separate execution pipeline for each stream of instructions to be executed in parallel. However, this requires a great deal of duplication in terms of hardware.

Instead therefore, another form of multi-threaded processor employs concurrency rather than parallelism, whereby the threads share a common execution pipeline (or at least a common part of a pipeline) and different threads are interleaved through this same, shared execution pipeline. Performance of a multi-threaded processor may still be improved compared to no concurrency or parallelism, thanks to increased opportunities for hiding pipeline latency. Also, this approach does not require as much extra hardware dedicated to each thread as a fully parallel processor with multiple execution pipelines, and so does not incur so much extra silicon.

One form of parallelism can be achieved by means of a processor comprising an arrangement of multiple tiles on the same chip (i.e. same die), each tile comprising its own separate respective processing unit and memory (including program memory and data memory). Thus separate portions of program code can be run in parallel on different ones of the tiles. The tiles are connected together via an on-chip interconnect which enables the code run on the different tiles to communicate between tiles. In some cases the processing unit on each tile may itself run multiple concurrent threads on tile, each tile having its own respective set of contexts and corresponding pipeline as described above in order to support interleaving of multiple threads on the same tile through the same pipeline.

In general, there may exist dependencies between the portions of a program running on different tiles. A technique is therefore required to prevent a piece of code on one tile running ahead of data upon which it is dependent being made available by another piece of code on another tile. There are a number of possible schemes for achieving this, but the scheme of interest herein is known as "bulk synchronous parallel" (BSP). According to BSP, each tile performs a compute phase and an exchange phase in an alternating cycle. During the compute phase each tile performs one or more computation tasks locally on tile, but does not communicate any results of its computations with any others of the tiles. In the exchange phase each tile is allowed to exchange one or more results of the computations from the preceding compute phase to and/or from one or more others of the tiles in the group, but does not yet proceed to the next compute phase. Further, according to the BSP principle, a barrier synchronization is placed at the juncture transitioning from the compute phase into the exchange phase, or transitioning from the exchange phase into the compute phase, or both. That is it say, either: (a) all tiles are required to complete their respective compute phases before any in the group is allowed to proceed to the next exchange phase, or (b) all tiles in the group are required to complete their respective exchange phases before any tile in the group is allowed to proceed to the next compute phase, or (c) both. In some scenarios a tile in the compute phase may be allowed to communicate with other system resources such as a network card or storage disk, as long as no communication with other tiles in the group is involved.

An example use of multi-threaded and/or multi-tiled processing is found in machine intelligence. As will be familiar to those skilled in the art of machine intelligence, a machine intelligence algorithm is based around performing iterative updates to a "knowledge model", which can be represented by a graph of multiple interconnected nodes. Each node represents a function of its inputs. Some nodes receive the inputs to the graph and some receive inputs from one or more other nodes, whilst the output of some nodes form the inputs of other nodes, and the output of some nodes provide the output of the graph (and in some cases a given node may even have all of these: inputs to the graph, outputs from the graph and connections to other nodes). Further, the function at each node is parameterized by one or more respective parameters, e.g. weights. During a learning stage the aim is, based on a set of experiential input data, to find values for the various parameters such that the graph as a whole will generate a desired output for a range of possible inputs. Various algorithms for doing this are known in the art, such as a back propagation algorithm based on stochastic gradient descent. Over multiple iterations based on the input data, the parameters are gradually tuned to decrease their errors, and thus the graph converges toward a solution. In a subsequent stage, the learned model can then be used to make predictions of outputs given a specified set of inputs or to make inferences as to inputs (causes) given a specified set of outputs.

The implementation of each node will involve the processing of data, and the interconnections of the graph correspond to data to be exchanged between the nodes. Typically, at least some of the processing of each node can be carried out independently of some or all others of the nodes in the graph, and therefore large graphs expose great opportunities for concurrency and/or parallelism.

SUMMARY

According to one aspect disclosed herein there is provided a processor comprising an arrangement of multiple tiles on the same chip, each tile comprising its own separate respective processing unit and memory including program memory and data memory, wherein separate portions of program code are arranged to run in parallel in different ones of the tiles. The processor further comprises an on-chip interconnect arranged to enable the code run on the different tiles to communicate between tiles; and an external interconnect comprising a non-time-deterministic mechanism implemented in dedicated hardware logic for communicating data off-chip, whereby data is sent over the external interconnect in the form of packets, each packet having a header in which a destination address is present, and whereby communication of packets over the external interconnect is non-time-deterministic. The external interconnect comprises an external exchange block configured to provide flow control and queuing of the packets. One of the tiles is nominated by a compiler of the code to send an external exchange request message to the exchange block, the external exchange request message comprising one or more control packets indicating which of the tiles have data packets to send to a destination on another chip (the data packets containing content). To perform said flow control, the exchange block is configured to: A) send an exchange-on control packet to a first of the tiles indicated in the exchange request message as having data to send externally, to cause the first tile to start sending packets to their destinations via the external interconnect, being queued in a queue of the exchange block; and then B) once this tile has sent its last data packet, send an exchange-off control packet to this tile to cause it to stop sending packets, and send another exchange-on control packet to the next tile indicated in the exchange request message as having data packets to send (and so forth). I.e. the sending of the exchange-on control packet and the exchange-off control packet is repeated for each tile in turn indicated in the exchange request message, until all the tiles indicated in the exchange request message have sent their respective packets.

Thus in a given program, the compiler can nominate one or more of the tiles to perform input and/or output (I/O). This may be subset of the tiles on the chip (e.g. one, two or four of the tiles out of tens or hundreds of tiles), but in general any or all of the tiles could be programmed to perform the I/O. In operation, the compiled program on a nominated one of the I/O tiles sends the exchange request message on behalf of the other tiles that are to send data off-chip, telling the exchange block which are those tiles with data to send. Based on this, the exchange block arranges that all the tiles with data to send get serviced in a non-contended schedule.

Via the exchange request, the compiled program can demand of the exchange block the right to send data. The exchange request on behalf of a given sending tile lasts indefinitely (until all that tile's current data is sent). However, there are multiple sending tiles all trying to access the same queue of the exchange block. The exchange block thus enforces that the multiple sending tiles are serviced in order, one after another, and thus resolves the contention. In embodiments the exchange block determines what order the sending tiles are serviced in (though in embodiments the particular order selected does not matter, as long as they are serviced one after another).

As long as the tiles between them have enough data to send, the described mechanism can always keep the external bandwidth saturated (e.g. the bandwidth of an external connection such as a network or bus between the external interconnect and the destination or destination, via which the packets are sent between the external interconnect and the destination or destination). Even though the exchange may not be efficient at a level of one individual tile, the external exchange request and exchange block see to it that the external connection is kept busy, and preferably that its bandwidth is kept substantially saturated. This means no other special arrangements have to be made to keep the bandwidth saturated.

The data packets are packets that contain content (as opposed to control packets which are used for control signalling).

The external interconnect is so-called because it is for communicating externally. It may be implemented internally on the same chip as the tiles. Alternatively it could be implemented outside the chip.

The program memory and data memory may be implemented in different addressable memory units. Alternatively, the program memory and data memory may be implemented in different regions of the same addressable memory units. A combination of these approaches may also be used.

In embodiments the destination of at least some of the packets may be another tile or tiles on another chip. In embodiments the destination of at least some of the packets may be a host subsystem comprising a host CPU, and said processor may be arranged as a work accelerator to perform work allocated by the host. In further embodiments the destination of at least some of the packets may be a storage device.

The external interconnect is a non-time deterministic interconnect, meaning the communication of packets over the external interconnect is non-time-deterministic. In embodiments the internal interconnect may be a time-deterministic interconnect, the communication of data between tiles on chip being time-deterministic.

In this case the exchange block, and exchange protocol comprising the exchange-on, exchange-off and exchange request message, advantageously provide a mechanism or "gear box" to bridge the gap between the time-deterministic realm and the non-time-deterministic realm. They allow the time-deterministic realm to request a time deterministic schedule from the non-time-deterministic realm.

In embodiments, at the physical layer the external interconnect mechanism may be lossy, but at the transaction layer the mechanism may not be lossy due to an architecture whereby, if a packet is not acknowledged, it will be resent automatically by hardware in the external interconnect. Note however that the exchange request mechanism can in fact apply regardless of the cause of the loss, or more generally the cause of the non-time determinism, over the external interconnect. For example in alternative embodiments the external interconnect mechanism may be lossless at the physical layer but lossy at the transaction layer. In another alternative embodiment the external interconnect may be lossless at the physical and transaction layer, but may be non-time-deterministic because, e.g., the mechanism involves queuing and/or out-of-order transmission. A lossy transaction layer protocol, or a congested lossless interconnect, may also result in non-time deterministic transmission that would benefit from the application of the disclosed mechanism to bridge between the time deterministic and non-time-deterministic realms.

The exchange mechanism can also apply regardless of whether the external link or connection to the destination is lossy (e.g. ethernet) or (as above, reliable, e.g. PCI). In the event of a lossy link, as long as packet loss was detected then the situation can be recovered by re-doing the entire exchange. Thus the scope of the disclosed techniques can cover the use of both lossy (e.g. ethernet) and reliable (e.g. PCI) external fabrics.

In embodiments, the exchange block may be configured so as, if at any time the exchange block is unable to continue sending packets over the external interconnect, the exchange block sends an exchange-off control packet to the sending tile before the exchange block's queue overflows; and once the congestion is cleared and the exchange block has sufficient space in its queue it will send an exchange-on control packet to the sending tile allowing it to continue transmitting its content.

The congestion may be due to oversubscription of the interconnect, e.g. by other tiles and/or other exchange blocks (i.e. due to the queue filling up). Alternatively or additionally, the congestion may be due to previous packet loss and re-transmission in the external interconnect.

In embodiments, the external interconnect may take the form of a network in which case the header further comprises information for routing purposes.

In embodiments, the external interconnect may be configured to use clock-data-recovery technology to infer a clock from a received data stream having sufficient data signal transitions to maintain a bit-lock. Alternatively an explicit clock could be used. E.g. in alternative embodiments, the external interconnect may be configured to use a clock signalled explicitly by the destination or from elsewhere (e.g. a common clock common to both the destination and the external interconnect).

In embodiments the external interface may be configured to send the packets to the destination or destination via a PCI, PCIe or Ethernet bus or network between the external interface and the destination or destinations. More generally however the disclosed mechanism is not limited to use in conjunction with these particular external protocols and can be used in conjunction with any type of external bus, network or other such connection.

In embodiments, a group of some or all of the tiles modules may be programmed to operate in a series of bulk synchronous parallel, BSP, supersteps, whereby in each superstep the group performs:
  a compute phase in which the tiles in the group performs computations but does not exchange results of the computations outside the chip, and then
  an exchange phase in which at least some of the tiles in the group exchange the results of one or more of the computations with the off-chip destination or destinations, said at least some of the tiles being those indicated in the exchange request; and
  the group is synchronized by a barrier synchronization between each current superstep in the series and the next, whereby each tile in the group waits for all in the group to complete the compute phase of the current superstep before advancing to the exchange phase of the next superstep.

In embodiments, the on-chip and/or external interconnect may comprise hardware logic configured to conduct said barrier synchronization by:
  receiving a sync request from each of the tiles in the group, and
  issuing a sync acknowledgement on condition that the sync requests are received from all of the group;
  wherein each of the tiles in the group is further configured to suspend instruction issue in the respective processing unit the issue of the sync acknowledgment.

In embodiments, the respective processing unit on each of the tiles may be configured to execute instructions from a predefined instruction set; and wherein the instruction set of some or all of the tiles comprises a sync instruction which causes the tile on which it is executed to send the sync request.

In embodiments, the exchange block may comprise a plurality of exchange block contexts, each configured to implement an instance of said flow control mechanism for a different respective subset of the tiles.

In embodiments the processor may comprise at least twenty of said tiles. In embodiments the processor may comprise at least fifty of said tiles. In embodiments the processor may comprise at least one hundred of said tiles.

In embodiments, the processor may be arranged to perform said sending without using a DMA engine, wherein instead a subset of the tiles are nominated by the compiler to act as I/O tiles to perform said sending of data to the off-chip destination and/or to read data from the off-chip destination, said subset being the tiles indicated in the exchange request message. In embodiments the processor comprises no on-chip DMA engine and is arranged instead to use said nominated I/O tiles. In some embodiments the system comprises no on- or off-chip DMA engine at all.

To transfer data via a processor, the processor has to execute load instructions to load values from memory into its registers, and send instructions to send the values from its registers out to an external port or other such interface. In conventional processors with a single processing unit or small number of cores, this consumes a large amount of the processor's processing cycles executing load and send instructions just to transfer data off-chip. Hence normally it is not desired to burden a processor with this. Instead, a DMA (direct memory access) engine is usually provided on the same chip as the processor. The DMA engine may be programmable or non-programmable. A programmable DMA executes separate code which performs an external transfer on behalf of the processor. A non-programmable DMA engine enables the processor to send a descriptor to the DMA engine specifying a series of external transactions, and the DMA engine will enact the specified transactions without further involvement of the processor. Either way, the processor is thus relieved of some of all of the processing that would otherwise be involved in transferring data off-chip.

However, a transfer performed by the processor itself rather than a DMA engine can actually be faster. Further, in embodiments of the presently disclosed processor, the processor may in fact comprise a large number of tiles (e.g. ≥20 tiles, ≥50 tiles, or ≥100 tiles). This presents an opportunity to do away with the DMA engine without consuming too much of the processor's resources performing I/O. Instead, the compiler nominates only a subset of the tiles to act as I/O tiles. E.g. this may be, say, only 2 or 4 tiles out of tens, or a hundred or more tiles; or fewer than 1%, 2%, 5% or 10% of the tiles on the chip. Thus the performance argument for a DMA engine no longer applies.

This scheme can be particularly appropriate in the case of a BSP scheme where it is chosen to serialize compute and exchange. I.e. since most or all of the compute is being separated from the exchange phase anyway, the burden of involving the processor in the off-chip transfer is less of an issue, whilst in the compute phase there will be no exchange anyway so no performance impact on the computation.

In embodiments, the external interface may be configured to send the packets to the destination or destination via a connection (e.g. said bus or network) between the external interface and the destination or destinations, said link having a first bandwidth for sending the packets; and wherein each of the tiles has a second bandwidth for sending the packets, wherein the number of tiles nominated as I/O tiles may be at least the first bandwidth divided by the second bandwidth rounded up or down to the nearest whole number.

The optimal number of nominated tiles depends on the external I/O bandwidth of one tile compared to the I/O bandwidth of the chip. E.g. in one exemplary implementation, each tile has 32 Gbps bandwidth full duplex, and the chip has 1536 Gbps external SERDES bandwidth. So on that basis 48 tiles are required to fully subscribe the off-chip bandwidth. In other implementations the numbers may be different, and the optimal number will depend on the bandwidth of the tile versus the external off-chip bandwidth of the chip.

Another advantage is that, in embodiments, all data movement can be determined by the compiler, which helps with determinism.

According to another aspect disclosed herein there is provided a system comprising the processor and the off-chip destination or destinations of the packets.

According to another aspect disclosed herein there is provided a method of operating the processor or system, the method comprising: running the compiler on a computer in order to compile the code, wherein the compilation comprises the compiler nominating which of the tiles is to send the exchange request message; and running the compiled code on the processor, thereby causing the nominated tile to send the exchange request message to the exchange block to cause the exchange block to perform said queuing and flow control, and causing the tiles indicated in the exchange request message to perform the sending of their packets.

In embodiments the compilation may comprise the compiler nominating which of the tiles are the I/O tiles.

BRIEF DESCRIPTION OF THE DRAWINGS

To aid understanding of the present disclosure and to show how embodiments may be put into effect, reference is made by way of example to the accompanying drawings in which.

DETAILED DESCRIPTION OF EMBODIMENTS

Figure 21:
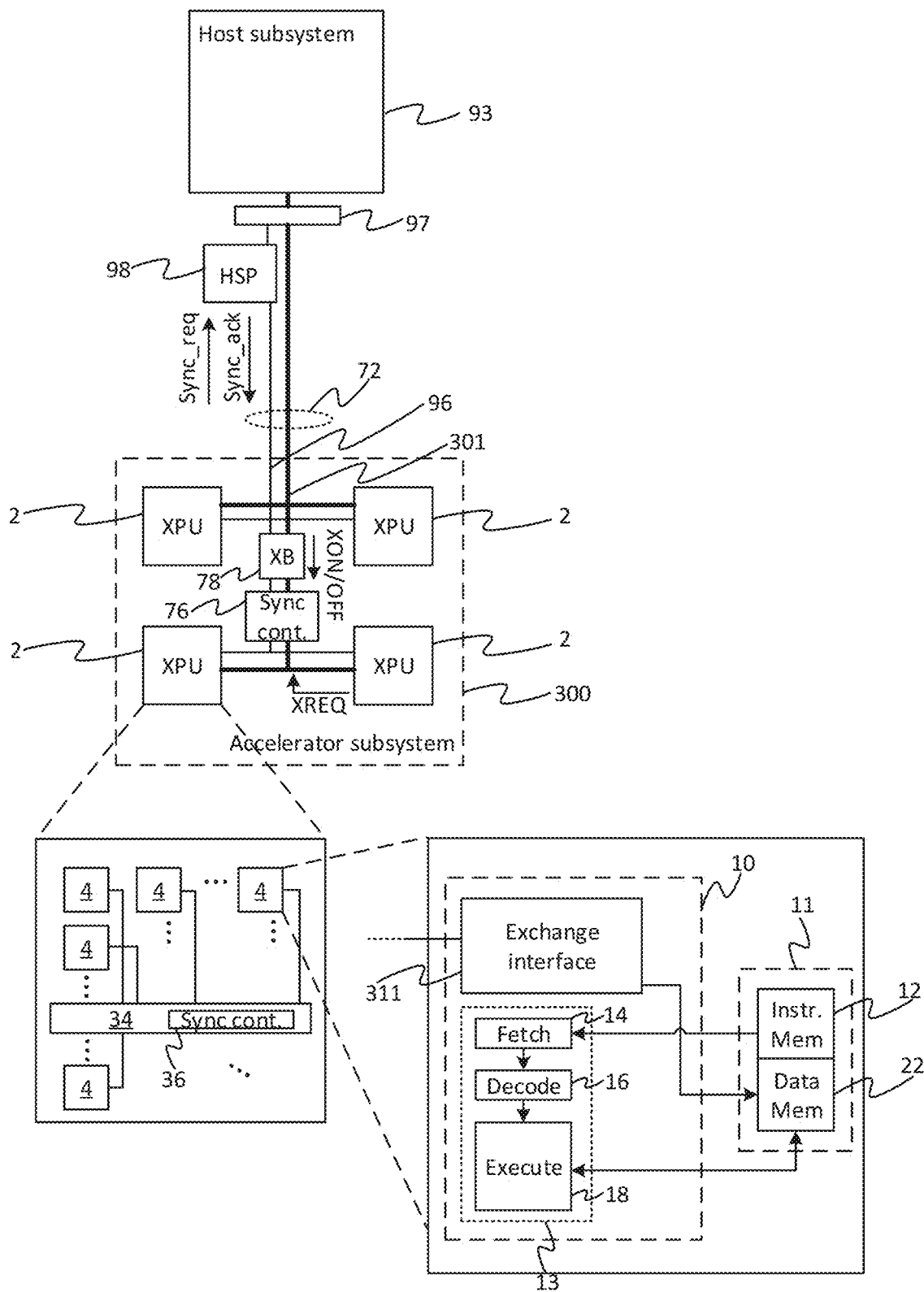
FIG. 21 is a schematic block diagram of a system of multiple processor modules.

FIG. 21 shows an example system in accordance with embodiments of the present disclosure. The system comprises multiple processor modules. These may comprise processors on different chips (dies) 2, and/or different processor tiles 4 on a given chip 2. In embodiments the system comprises multiple processor chips 2 connected together by an external (inter-chip) interconnect 72. The chips 2 could be packaged on the same integrated circuit (IC) package, or different packages, or some on the same package and some on different packages. In embodiments the external interconnect 72 may be a non-time-deterministic interconnect, whereby exchange of data over this interconnect is non-time-deterministic in nature. Further details of this will be discussed shortly, and also later with respect to FIG. 19.

Further, in embodiments, each of one, some or all of the processor chips 2 may comprise a respective array of tiles 4. Each tile 4 comprises a respective processing unit 10 and memory 11. In embodiments the processing unit 10 on each of the tiles 4 is a multithreaded processing unit 10 for running multiple concurrent threads on the tile 4. An example implementation of the will be discussed in more detail later with reference of FIGS. 1 to 4. The tiles 4 are connected together via an internal (on-chip), inter-tile interconnect 34 which enables transfer of data between tiles 4. In embodiments the inter-tile interconnect 34 may be a time-deterministic interconnect, enabling time-deterministic exchange of data between tiles 4. An example implementation of this will be described in more detail later with reference to FIGS. 16 and 17. The internal interconnect 34 may also enable synchronization between tiles 4. Further example details of this will be discussed in relation to, e.g., FIGS. 7 and 11.

Each tile 4 comprises a respective processing unit 10 comprising an execution unit 13, e.g. pipeline. Each 4 tile also comprises a respective memory 11 comprising a respective instruction memory 12 for storing code to be executed by the respective execution unit 10, and a respective data memory storing data operated on by the respective executed code (data to be operated on by the code, and/or data resulting from the operations). The execution unit 13 comprises a fetch stage 14, decode stage 16 and execution stage 18, preferably arranged in a pipelined manner. The fetch stage 14 controls the issue of machine code instructions from the instruction memory 12 into the rest of the pipeline or execution unit 13, to be decoded and executed by the decode and execution stages 16, 18 respectively. If instruction issue is paused on the respective tile 4, this means the pipeline or execution unit 13 stops executing its respective code until instruction issue is resumed.

In embodiments the processing unit 10 on each tile 4 is a multi-threaded processing unit 10, arranged to run multiple concurrent threads interleaved through the same respective pipeline 13, each in a respective time-slot with its program state held in a respective set of context registers. The threads on each tile 4 may include a respective supervisor thread and a respective plurality of worker threads. Example implementation details for this will be discussed in more detail later with respect to FIGS. 1 to 4. When instruction issue is paused or suspended, it is suspended for all slots on the tile 4 (i.e. instructions from no threads are issued).

Each tile 4 also comprises an exchange interface 311 for handling the exchange of data between the respective data memory 22 and the exterior of the tile 4 via the internal or external interconnect 36, 76 (depending on whether an internal or an external exchange).

In embodiments the system may further comprise a host subsystem 93, and the processor modules 2, 4 may be arranged as accelerator processors (XPUs) to provide an accelerator subsystem 300 to the host 93. The host 93 comprises at least one host processor configured with the role of a host for allocating work to the accelerator subsystem 300, and each of the accelerators 2, 4 in the accelerator subsystem 300 is arranged to perform work allocated by the host 93. The host 93 is privileged and the accelerator devices 2, 4 undertake work delegated by the host 93. In embodiments each of the accelerator processor chips 2 may take the form of an IPU ("Intelligence Processing Unit") designed specially for use as a machine intelligence accelerator processor.

The host 93 may take the form of a single host CPU, or it may also comprises one or more gateway processors (not shown) arranged as intermediaries between the host CPU and the accelerator processors 2. One or more of the gateways may also be connected to one or more network attached storage devices (NASs). The gateway(s) may for example be arranged to buffer streams of data destined for the accelerators 2 from the NAS(s); such as sequences of images, audio streams or other streams of experience data which are to be streamed to the accelerator processors 2 in order for them to conduct machine learning based thereon, e.g. to train a neural network to identify objects, faces, sounds, or other structures in the received experience data.

The inter-processor interconnect 72 also connects the accelerator processors 2 to the host 93 via a suitable host interface 97 such as a PCI, PCIe or Ethernet interface. The inter-processor interconnect 72 comprises a network of data paths 301 for exchanging data between accelerator processors 2 and/or between accelerator 2 and host 93.

The interconnect(s) 34, 72 also comprise a mechanism for synchronizing between the processor modules 2, 4, and in embodiments also for synchronizing between the host 93 and the processor modules 2, 4. This mechanism may comprise a synchronization (sync) network 96 separate from the data paths 301 of the inter-processor interconnect 72, plus synchronization logic 36, 76, 98 for sending sync requests and sync acknowledgment signals over the sync network 96. This mechanism may be used to implement a BSP scheme.

The synchronization logic may comprise an internal sync controller 36 in the internal interconnect 34, for synchronizing between a group of some or all of the tiles 4 on a given chip 2. When a tile 4 has reached a certain point, e.g. finished its compute phase, then it sends a sync request over the sync network 96 and suspends instruction issue on that tile 4 until it receives back a sync acknowledgment signal over the sync network 96. In the case of an internal sync, the internal sync controller 36 only returns the sync acknowledgment once a sync request has been received from all the tiles 4 in the group. The synchronization logic 36 may also comprise an external sync controller 76 for synchronizing between a group of some or all of the chips 2. Again when a tile 4 has reached a certain point, e.g. finished its compute phase, then it sends a sync request over the sync network 96 and suspends instruction issue on that tile 4 until it receives back a sync acknowledgment signal over the sync network 96.

In the case of an external sync not involving host involvement, the external sync controller 76 is responsible for returning the sync acknowledgment. It does so only once a sync request has been received from all the chips 2 in the group. In the case of an external sync requiring host involvement, another piece of logic called the host sync proxy (HSP) 98 is responsible for returning the sync acknowledgment. It does so only if the host has written to a register in the HSP 98 granting the sync barrier to be passed. For illustrative purposes in FIG. 21 the HSP 98 is shown as receiving the sync request and issuing the sync acknowledgement, but it will be appreciated this may also be done by the internal or external sync logic 36, 76 depending on the hierarchical level of the sync operation and whether host involvement is required. The HSP 98 may be considered part of the external interconnect 76, at least conceptually or schematically speaking. Physically it may be implemented either off-chip in the hardware of the interconnect 76 between chips, or alternatively on-chip in the same chip as one or more of the gateways if gateways are used. Example details of the sync controllers 36, 76 will be discussed later with respect to, e.g., FIGS. 11 and 14. Example implementation details of HSP 98 will be discussed later with respect to FIGS. 18 and 20.

In embodiments, the sending of a sync request may be triggered by executing a dedicated SYNC instruction included in the instruction set of the tiles 4. The hierarchical level of the sync operation (e.g. on-chip, between chips, or host involvement) may be set by an operand of the SYNC instruction. Example implementation details of this will also be discussed later.

In embodiments the inter-processor interconnect 72 is a non-time-deterministic interconnect, in that the transmission of data over the data paths 301 of this interconnect 72 (as opposed to sync signalling over the sync network 96) is non-time-deterministic in nature. I.e. the timing cannot be known or at least not guaranteed, e.g. because delivery is not guaranteed and therefore may require retransmission.

It may be less practical to make communications between chips time-deterministic. External (off-chip) communication experiences greater uncertainty compared to internal (on-chip) communication. For instance, external exchange is less local, meaning wires reach further and hence are more capacitive, and more vulnerable to noise. This in turn may result in loss and hence the need for flow control mechanism which provides for retransmission at the physical layer. Alternatively, the interconnect between chips 2 may be lossless at the physical and/or link layer, but is actually lossy at the higher networking layer due to contention of network layer flows between different sources and destinations causing queues to be over-flowed and packets dropped.

It would be desirable to provide a mechanism for synchronizing the exchange of data between chips 2. For instance it may be desired to facilitate a BSP exchange scheme across a system comprising multiple processing tiles arranged into different time-deterministic domains, wherein communications between tiles in the same domain are time-deterministic, but communications between tiles in different domains are non-time-deterministic.

According to embodiments disclosed herein, the external interconnect 72 is equipped with at least one exchange block (XB) 78 configured to operate as follows.

When there is an external exchange to perform between tiles 4 on different chips 2, software (e.g. supervisor thread) running on at least one of the tiles 4 sends an external exchange request message (XREQ) to the exchange block 78. The exchange request may be sent as a control packet over the same data path 301 as used to exchange data (i.e. data content). However it is not excluded that it could be signalled over a separate control path built into the external interconnect 72. In embodiments a single one of the tiles 4 sends the exchange request on behalf of all the tiles 4 with data to send externally (off-chip) in a current exchange phase (e.g. an exchange phase of a BSP superstep), or at least all of those within a certain group (which in embodiments may be the same as the sync group). The compiler determines which tile 4 is to send the exchange request on behalf of which others and complies the software (e.g. supervisor thread) on the responsible tile 4 with a suitable instruction or instructions to send the exchange request. This may be possible for example because the system is running a pre-compiled static graph.

The exchange request message(s) tells the exchange block 78 which tiles 4 have data content to exchange externally in the current exchange phase. The exchange block 78 starts with one of these indicated tiles 4 by sending an "exchange-on" message (XON) to that tile 4. In response, the tile 4 in question begins transmitting data packets over the external interconnect 72 each indicating a destination tile 4 in a header of the packet. The exchange block 78 comprises a queue (FIFO buffer) arranged to receive and buffer the packets sent over the external interconnect 72. At the other end of the queue the exchange block 78 routes the packets to their destination based on their headers. Once the currently transmitting tile 4 has sent its last packet, the exchange block 78 sends an exchange-off (XOFF) message to that tile 4 (the exchange block 78 can determine that a given packet is the last packet from a given tile 4 based on a 'last packet' flag in the packet header emitted by the tile). The exchange block 78 then sends an exchange-on to the next tile 4 indicated in the exchange request(s) as having data to send, and so forth until all the indicated tiles 4 have sent all the packets they had to send in the current exchange phase. The exchange-on and exchange-off messages may be sent as control packets over the same data path 301 as used to exchange data (i.e. data content). Alternatively it is not excluded that they could be signalled over a separate control path built into the external interconnect 72.

In embodiments the exchange mechanism does not distinguish between transmission from external tiles 4 and external sources other than tiles 4, or at least does not exclude transmissions from other such sources. For example such other external sources could comprise the host 93, and/or one or more other external sources such as an external storage drive, network card, etc. In such cases the exchange request (XREQ) from one of the tiles 4 (e.g. as determined by the compiler) may also specify one or more of the other external sources, e.g. host 93.

Thus each tile 4 is advantageously provided with a mechanism to exchange data between domains that are non-time-deterministic or asynchronous with respect to one another.

Figure 8:
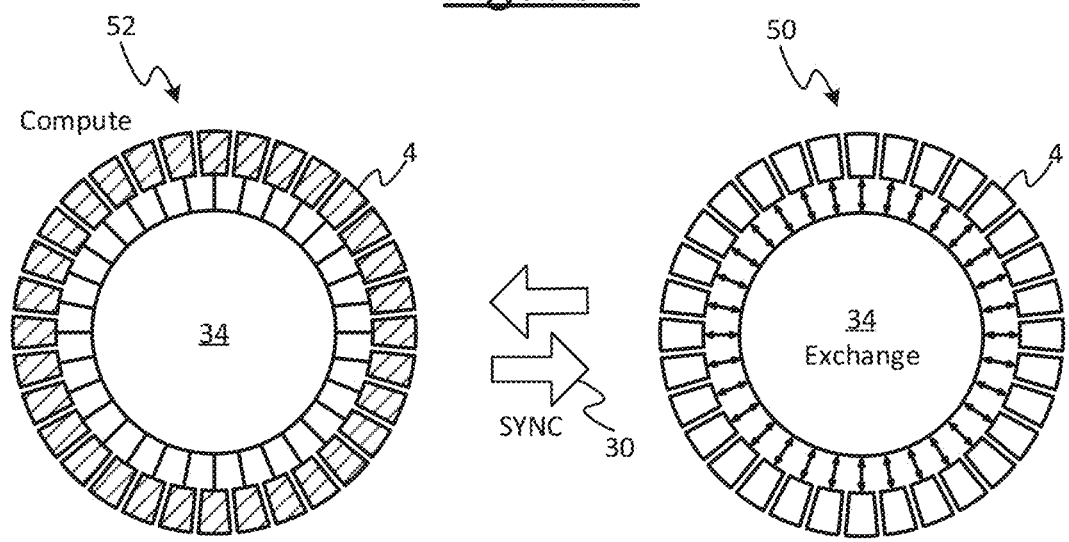
FIG. 8 is a schematic illustration of a bulk synchronous parallel (BSP) computing model.
Figure 9:
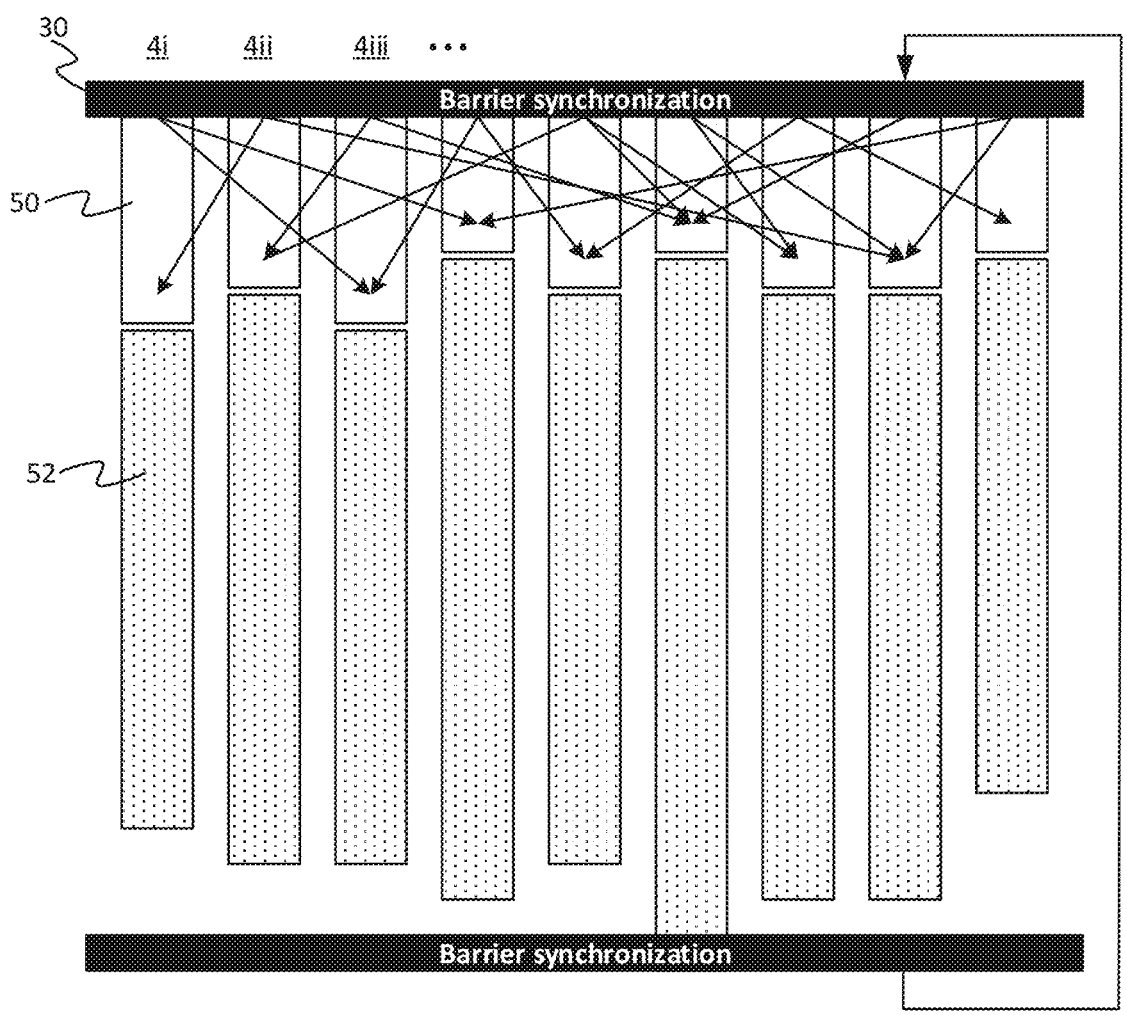
FIG. 9 is another schematic illustration of a BSP model.

In embodiments the disclosed mechanism may be used to implement a BSP scheme. As illustrated in FIGS. 8 and 9, in a BSP scheme, the system operates in an alternating cycle of exchange phase 50 and a compute phase 52. In each cycle, the exchange phase 50 comprises a respective exchange phase on each tile 4, and the compute phase 52 comprises a respective compute phase on each tile 4. In the present case a barrier synchronization 30 is placed between the compute phase 52 and next exchange phase 50 each cycle. I.e. all the tiles 4 are required to complete their respective compute phase 52 before any is allowed to proceed to the next exchange phase 50. In embodiments this may be implemented by the above-described synchronization mechanism based on the system of sync requests and acknowledgments sent via the sync network 96, and on the sync logic 36, 76 in the interconnects 34, 72 (and in embodiments the HSP 98). That is, when a tile 4 has completed its current compute phase 52 and is ready to sync, then software on that tile 4 (e.g. the supervisor thread) sends out a sync request and suspends instruction issue until a sync acknowledgement is received back. In embodiments this is done by executing a SYNC instruction on the respective tile 4. In embodiments this is an instance of the SYNC instruction with its mode operand set to specify a barrier type synchronization (and in embodiments also specifying one of a plurality of different possible sync groups amongst which to perform the barrier synchronization).

When a given tile 4 has completed its current respective exchange phase 50, it can proceed directly to its next compute phase 52—it does not need to wait for all the other tiles 4 to complete their exchange phases. Nonetheless, the compute phase 52 on the given tile 4 may still be dependent on receiving data from one or some other tiles 4 and/or other external sources. For data from tiles 4 on the same chip, the program can time any dependent computations relative to the known exchange timing of the time-deterministic interconnect (to be discussed in more detail later with respect to FIGS. 16 and 17). Note: for the sake of illustration, the above discussion by reference to FIG. 9 has assumed that every exchange involves an external exchange between at least some tiles 4 on different chips 2. In the fact the BSP behaviour may be split into internal and external domains, as will be discussed later with respect to FIG. 13. Nonetheless, the principle of synchronizing to the receipt of external data still applies.

By way of illustration, the following now describes further optional details for implementing the features of the systems of FIG. 21 or similar. Further example details of the external exchange mechanism will be described in relation to FIG. 19 in context of the example implementations of 1 to 18 and 20.

Figure 1:
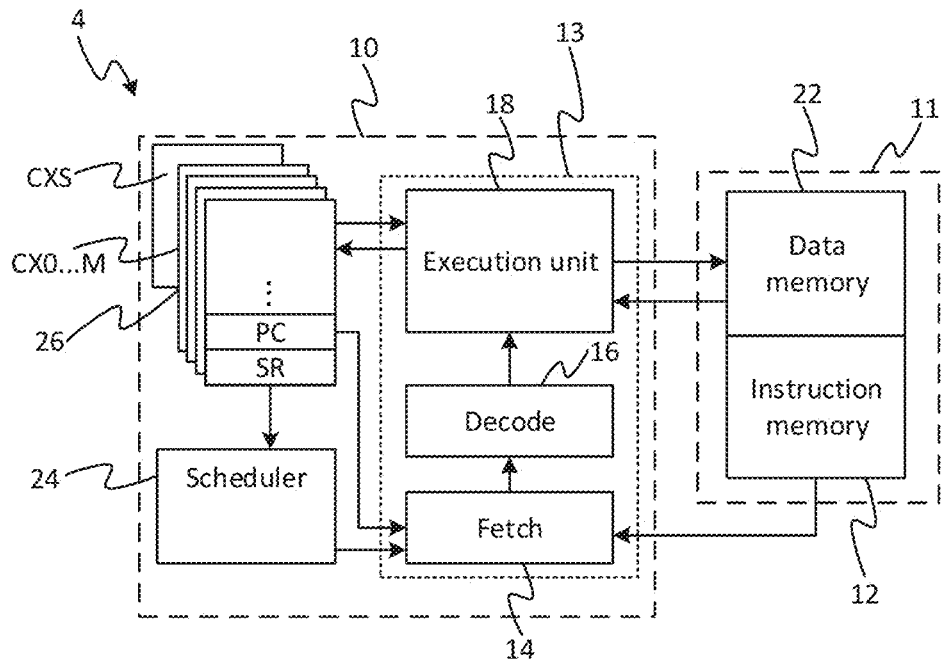
FIG. 1 is a schematic block diagram of a multi-threaded processing unit.

FIG. 1 illustrates an example of a processor module 4 in accordance with embodiments of the present disclosure. For instance the processor module 4 may be one tile of an array of like processor tiles on a same chip, or may be implemented as a stand-alone processor on its own chip. The processor module 4 comprises a multi-threaded processing unit 10 in the form of a barrel-threaded processing unit, and a local memory 11 (i.e. on the same tile in the case of a multi-tile array, or same chip in the case of a single-processor chip). A barrel-threaded processing unit is a type of multi-threaded processing unit in which the execution time of the pipeline is divided into a repeating sequence of interleaved time slots, each of which can be owned by a given thread. This will be discussed in more detail shortly. The memory 11 comprises an instruction memory 12 and a data memory 22 (which may be implemented in different addressable memory unit or different regions of the same addressable memory unit). The instruction memory 12 stores machine code to be executed by the processing unit 10, whilst the data memory 22 stores both data to be operated on by the executed code and data output by the executed code (e.g. as a result of such operations).

The memory 12 stores a variety of different threads of a program, each thread comprising a respective sequence of instructions for performing a certain task or tasks. Note that an instruction as referred to herein means a machine code instruction, i.e. an instance of one of the fundamental instructions of the processor's instruction set, consisting of a single opcode and zero or more operands.

The program described herein comprises a plurality of worker threads, and a supervisor subprogram which may be structured as one or more supervisor threads. These will be discussed in more detail shortly. In embodiments, each of some or all of the worker threads takes the form of a respective "codelet". A codelet is a particular type of thread, sometimes also referred to as an "atomic" thread. It has all the input information it needs to execute from the beginning of the thread (from the time of being launched), i.e. it does not take any input from any other part of the program or from memory after being launched. Further, no other part of the program will use any outputs (results) of the thread until it has terminated (finishes). Unless it encounters an error, it is guaranteed to finish. N.B. some literature also defines a codelet as being stateless, i.e. if run twice it could not inherit any information from its first run, but that additional definition is not adopted here. Note also that not all of the worker threads need be codelets (atomic), and in embodiments some or all of the workers may instead be able to communicate with one another.

Within the processing unit 10, multiple different ones of the threads from the instruction memory 12 can be interleaved through a single execution pipeline 13 (though typically only a subset of the total threads stored in the instruction memory can be interleaved at any given point in the overall program). The multi-threaded processing unit 10 comprises: a plurality of context register files 26 each arranged to represent the state (context) of a different respective one of the threads to be executed concurrently; a shared execution pipeline 13 that is common to the concurrently executed threads; and a scheduler 24 for scheduling the concurrent threads for execution through the shared pipeline in an interleaved manner, preferably in a round robin manner. The processing unit 10 is connected to a shared instruction memory 12 common to the plurality of threads, and a shared data memory 22 that is again common to the plurality of threads.

The execution pipeline 13 comprises a fetch stage 14, a decode stage 16, and an execution stage 18 comprising an execution unit which may perform arithmetic and logical operations, address calculations, load and store operations, and other operations, as defined by the instruction set architecture. Each of the context register files 26 comprises a respective set of registers for representing the program state of a respective thread.

Figure 2:
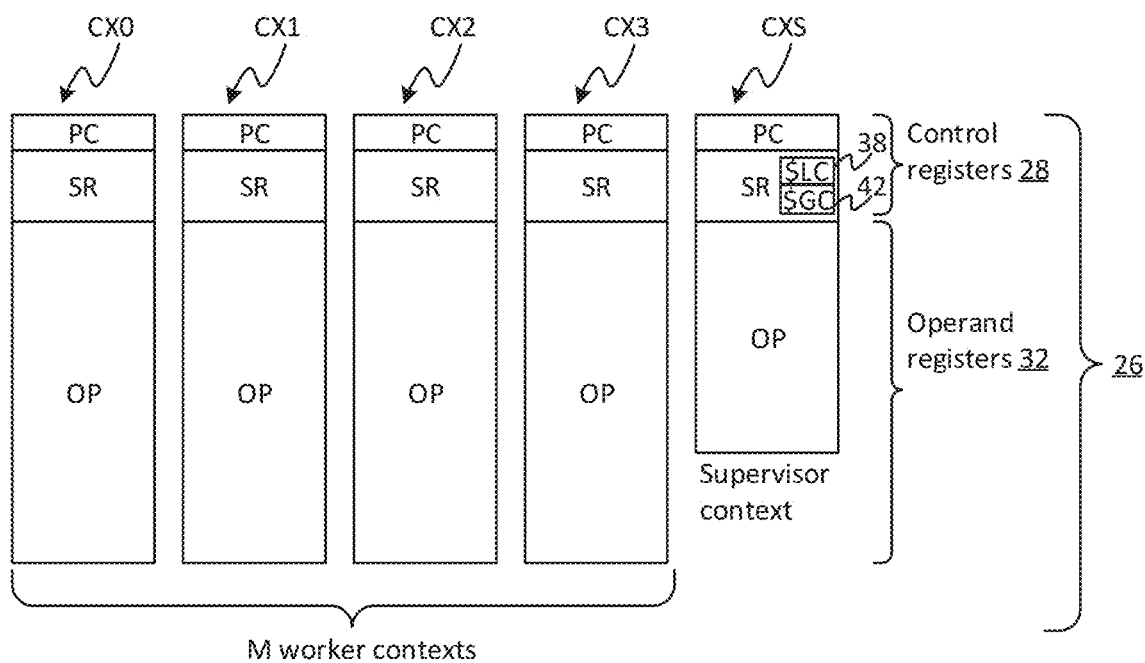
FIG. 2 is a schematic block diagram of a plurality of thread contexts.

An example of the registers making up each of the context register files 26 is illustrated schematically in FIG. 2. Each of the context register files 26 comprises a respective one or more control registers 28, comprising at least a program counter (PC) for the respective thread (for keeping track of the instruction address at which the thread is currently executing), and in embodiments also a set of one or more status registers (SR) recording a current status of the respective thread (such as whether it is currently running or paused, e.g. because it has encountered an error). Each of the context register files 26 also comprises a respective set of operand registers (OP) 32, for temporarily holding operands of the instructions executed by the respective thread, i.e. values operated upon or resulting from operations defined by the opcodes of the respective thread's instructions when executed. It will be appreciated that each of the context register files 26 may optionally comprise a respective one or more other types of register (not shown). Note also that whilst the term "register file" is sometimes used to refer to a group of registers in a common address space, this does not necessarily have to be the case in the present disclosure and each of the hardware contexts 26 (each of the register sets 26 representing each context) may more generally comprise one or multiple such register files.

In embodiments, the arrangement comprises one worker context register file CX0 . . . CX(M−1) for each of the number M of threads that can be executed concurrently (M=3 in the example illustrated but this is not limiting), and one additional supervisor context register file CXS. The worker context register files are reserved for storing the contexts of worker threads, and the supervisor context register file is reserved for storing the context of a supervisor thread. Note that in embodiments the supervisor context is special, in that it has a different number of registers than each of the workers. Each of the worker contexts preferably have the same number of status registers and operand registers as one another. In embodiments the supervisor context may have fewer operand registers than each of the workers. Examples of operand registers the worker context may have that the supervisor does not include: floating point registers, accumulate registers, and/or dedicated weight registers (for holding weights of a neural network). In embodiments the supervisor may also have a different number of status registers. Further, in embodiments the instruction set architecture of the processor module 4 may be configured such that the worker threads and supervisor thread(s) execute some different types of instruction but also share some instruction types.

The fetch stage 14 is connected so as to fetch instructions to be executed from the instruction memory 12, under control of the scheduler 24. The scheduler 24 is configured to control the fetch stage 14 to fetch an instruction from each of a set of concurrently executing threads in turn in a repeating sequence of time slots, thus dividing the resources of the pipeline 13 into a plurality of temporally interleaved time slots, as will be discussed in more detail shortly. For example the scheduling scheme could be round-robin or weighted round-robin. Another term for a processor operating in such a manner is a barrel threaded processor.

In some embodiments, the scheduler 24 may have access to one of the status registers SR of each thread indicating whether the thread is paused, so that the scheduler 24 in fact controls the fetch stage 14 to fetch the instructions of only those of the threads that are currently active. In embodiments, preferably each time slot (and corresponding context register file) is always owned by one thread or another, i.e. each slot is always occupied by some thread, and each slot is always included in the sequence of the scheduler 24; though the thread occupying any given slot may happen to be paused at the time, in which case when the sequence comes around to that slot, the instruction fetch for the respective thread is passed over. Alternatively it is not excluded for example that in alternative, less preferred implementations, some slots can be temporarily vacant and excluded from the scheduled sequence. Where reference is made to the number of time slots the execution unit is operable to interleave, or such like, this refers to the maximum number of slots the execution unit is capable of executing concurrently, i.e. the number of concurrent slots the execution unit's hardware supports.

The fetch stage 14 has access to the program counter (PC) of each of the contexts. For each respective thread, the fetch stage 14 fetches the next instruction of that thread from the next address in the program memory 12 as indicated by the program counter. The program counter increments each execution cycle unless branched by a branch instruction. The fetch stage 14 then passes the fetched instruction to the decode stage 16 to be decoded, and the decode stage 16 then passes an indication of the decoded instruction to the execution unit 18 along with the decoded addresses of any operand registers 32 specified in the instruction, in order for the instruction to be executed. The execution unit 18 has access to the operand registers 32 and the control registers 28, which it may use in executing the instruction based on the decoded register addresses, such as in the case of an arithmetic instruction (e.g. by adding, multiplying, subtracting or dividing the values in two operand registers and outputting the result to another operand register of the respective thread). Or if the instruction defines a memory access (load or store), the load/store logic of the execution unit 18 loads a value from the data memory into an operand register of the respective thread, or stores a value from an operand register of the respective thread into the data memory 22, in accordance with the instruction. Or if the instruction defines a branch or a status change, the execution unit changes value in the program counter PC or one of the status registers SR accordingly. Note that while one thread's instruction is being executed by the execution unit 18, an instruction from the thread in the next time slot in the interleaved sequence can be being decoded by the decode stage 16; and/or while one instruction is being decoded by the decode stage 16, the instruction from the thread in the next time slot after that can be being fetched by the fetch stage 14 (though in general the scope of the disclosure is not limited to one instruction per time slot, e.g. in alternative scenarios a batch of two or more instructions could be issued from a given thread per time slot). Thus the interleaving advantageously hides latency in the pipeline 13, in accordance with known barrel threaded processing techniques.

Figure 3:
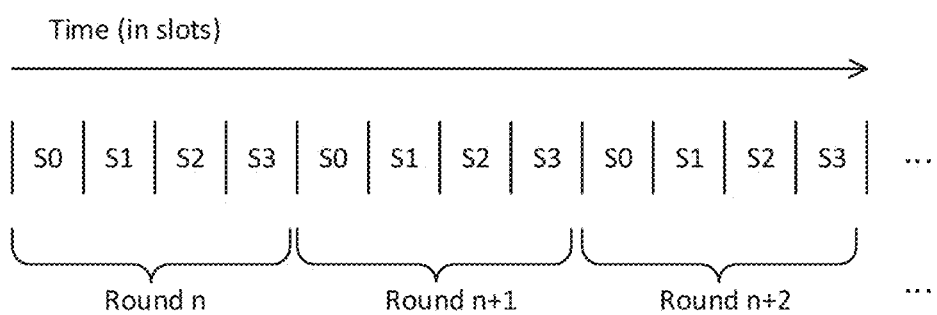
FIG. 3 schematically illustrates a scheme of interleaved time slots.

An example of the interleaving scheme implemented by the scheduler 24 is illustrated in FIG. 3. Here the concurrent threads are interleaved according to a round-robin scheme whereby, within each round of the scheme, the round is divided into a sequence of time slots S0, S1, S2 . . . , each for executing a respective thread. Typically each slot is one processor cycle long and the different slots are evenly sized, though not necessarily so in all possible embodiments, e.g. a weighted round-robin scheme is also possible whereby some threads get more cycles than others per execution round. In general the barrel-threading may employ either an even round-robin or a weighted round-robin schedule, where in the latter case the weighting may be fixed or adaptive.

Whatever the sequence per execution round, this pattern then repeats, each round comprising a respective instance of each of the time slots. Note therefore that a time slot as referred to herein means the repeating allocated place in the sequence, not a particular instance of the time slot in a given repetition of the sequence. Put another way, the scheduler 24 apportions the execution cycles of the pipeline 13 into a plurality of temporally interleaved (time-division multiplexed) execution channels, with each comprising a recurrence of a respective time slot in a repeating sequence of time slots. In the illustrated embodiment, there are four time slots, but this is just for illustrative purposes and other numbers are possible. E.g. in one preferred embodiment there are in fact six time slots.

Whatever the number of time slots the round-robin scheme is divided into, then according to present disclosure, the processing unit 10 comprises one more context register file 26 than there are time slots, i.e. it supports one more context than the number of interleaved timeslots it is capable of barrel-threading.

This is illustrated by way of example in FIG. 2: if there are four time slots S0 . . . S3 as shown in FIG. 3, then there are five context register files, labelled here CX0, CX1, CX2, CX3 and CXS. That is, even though there are only four execution time slots S0 . . . S3 in the barrel-threaded scheme and so only four threads can be executed concurrently, it is disclosed herein to add a fifth context register file CXS, comprising a fifth program counter (PC), a fifth set of operand registers 32, and in embodiments also a fifth set of one or more status registers (SR). Though note that as mentioned, in embodiments the supervisor context may differ from the others CX0 . . . 3, and the supervisor thread may support a different set of instructions for operating the execution pipeline 13.

Each of the first four contexts CX0 . . . CX3 is used to represent the state of a respective one of a plurality of "worker threads" currently assigned to one of the four execution time slots S0 . . . S3, for performing whatever application-specific computation tasks are desired by the programmer (note again this may only be subset of the total number of worker threads of the program as stored in the instruction memory 12). The fifth context CXS however, is reserved for a special function, to represent the state of a "supervisor thread" (SV) whose role it is to coordinate the execution of the worker threads, at least in the sense of assigning which of the worker threads W is to be executed in which of the time slots S0, S1, S2 . . . at what point in the overall program. Optionally the supervisor thread may have other "overseer" or coordinating responsibilities. For example, the supervisor thread may be responsible for performing barrier synchronisations to ensure a certain order of execution. E.g. in a case where one or more second threads are dependent on data to be output by one or more first threads run on the same processor module 4, the supervisor may perform a barrier synchronization to ensure that none of the second threads begins until the first threads have finished. And/or, the supervisor may perform a barrier synchronization to ensure that one or more threads on the processor module 4 do not begin until a certain external source of data, such as another tile or processor chip, has completed the processing required to make that data available. The supervisor thread may also be used to perform other functionality relating to the multiple worker threads. For example, the supervisor thread may be responsible for communicating data externally to the processor module 4 (to receive external data to be acted on by one or more of the threads, and/or to transmit data output by one or more of the worker threads). In general the supervisor thread may be used to provide any kind of overseeing or coordinating function desired by the programmer. For instance as another example, the supervisor may oversee transfer between the tile local memory 12 and one or more resources in the wider system (external to the array 6) such as a storage disk or network card.

Note of course that four time slots is just an example, and generally in other embodiments there may be other numbers, such that if there are a maximum of M time slots 0 . . . M−1 per round, the processor module 4 comprises M+1 contexts CX . . . CX(M−1) & CXS, i.e. one for each worker thread that can be interleaved at any given time and an extra context for the supervisor. E.g. in one exemplary implementation there are six timeslots and seven contexts.

Figure 4:
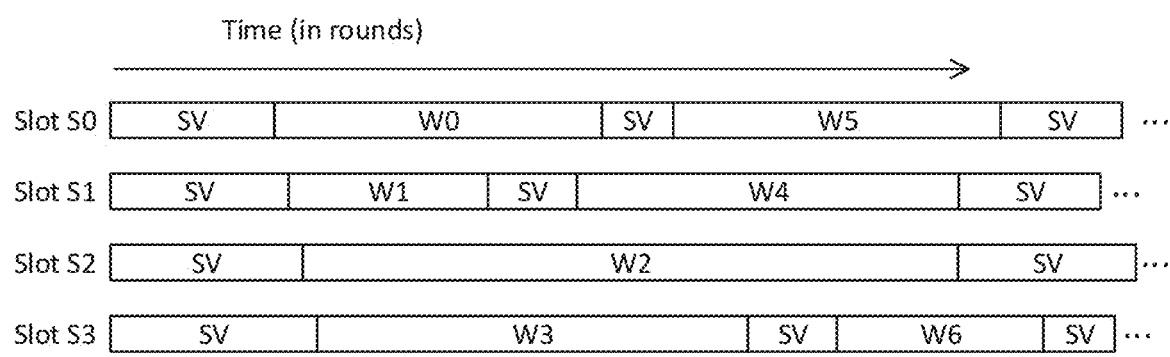
FIG. 4 schematically illustrates a supervisor thread and plurality of worker threads.

Referring to FIG. 4, the supervisor thread SV does not have its own time slot per se in the scheme of interleaved time slots. Nor do the workers as allocation of slots to worker threads is flexibly defined. Rather, each time slot has its own dedicated context register file (CX0 . . . CXM−1) for storing worker context, which is used by the worker when the slot is allocated to the worker, but not used when the slot is allocated to the supervisor. When a given slot is allocated to the supervisor, that slot instead uses the context register file CXS of the supervisor. Note that the supervisor always has access to its own context and no workers are able to occupy the supervisor context register file CXS.

The supervisor thread SV has the ability to run in any and all of the time slots S0 . . . S3 (or more generally S0 . . . SM−1). The scheduler 24 is configured so as, when the program as a whole starts, to begin by allocating the supervisor thread to all of the time slots, i.e. so the supervisor SV starts out running in all of S0 . . . S3. However, the supervisor thread is provided with a mechanism for, at some subsequent point (either straight away or after performing one or more supervisor tasks), temporarily relinquishing each of the slots in which it is running to a respective one of the worker threads, e.g. initially workers W0 . . . W3 in the example shown in FIG. 4. This is achieved by the supervisor thread executing a run instruction, called "RUN" by way of example herein. In embodiments this instruction takes two operands: an address of a worker thread in the instruction memory 12 and an address of some data for that worker thread in the data memory 22:

RUN task_addr, data_addr

The worker threads are portions of code that can be run concurrently with one another, each representing one or more respective computation tasks to be performed. The data address may specify some data to be acted upon by the worker thread. Alternatively, the run instruction may take only a single operand specifying the address of the worker thread, and the data address could be included in the code of the worker thread; or in another example the single operand could point to a data structure specifying the addresses of the worker thread and data. As mentioned, in embodiments at least some of the workers may take the form of codelets, i.e. atomic units of concurrently executable code. Alternatively or additionally, some of the workers need not be codelets and may instead be able to communicate with one another.

The run instruction ("RUN") acts on the scheduler 24 so as to relinquish the current time slot, in which this instruction is itself executed, to the worker thread specified by the operand. Note that it is implicit in the run instruction that it is the time slot in which this instruction is executed that is being relinquished (implicit in the context of machine code instructions means it doesn't need an operand to specify this—it is understood implicitly from the opcode itself). Thus the time slot which is given away is the time slot in which the supervisor executes the run instruction. Or put another way, the supervisor is executing in the same space that that it gives away. The supervisor says "run this piece of code at this location", and then from that point onwards the recurring slot is owned (temporarily) by the relevant worker thread.

The supervisor thread SV performs a similar operation in each of one or more others of the time slots, to give away some or all of its time slots to different respective ones of the worker threads W0 . . . W3 (selected from a larger set W0 . . . Wj in the instruction memory 12). Once it has done so for the last slot, the supervisor is suspended (then later will resume where it left off when one of the slots is handed back by a worker W).

The supervisor thread SV is thus able to allocate different worker threads, each performing one or more tasks, to different ones of the interleaved execution time slots S0 . . . S3. When the supervisor thread determines it is time to run a worker thread, it uses the run instruction ("RUN") to allocate this worker to the time slot in which the RUN instruction was executed.

In some embodiments, the instruction set also comprises a variant of the run instruction, RUNALL ("run all"). This instruction is used to launch a set of more than one worker together, all executing the same code. In embodiments this launches a worker in every one of the processing unit's slots S0 . . . S3 (or more generally S0 . . . S(M−1)).

Further, in some embodiments the RUN and/or RUNALL instruction, when executed, also automatically copies some status from one or more of the supervisor status registers CXS(SR) to a corresponding one or more status registers of the worker thread(s) launched by the RUN or RUNALL. For instance the copied status may comprise one or more modes, such as a floating point rounding mode (e.g. round to nearest or round to zero) and/or an overflow mode (e.g. saturate or use a separate value representing infinity). The copied status or mode then controls the worker in question to operate in accordance with the copied status or mode. In embodiments, the worker can later overwrite this in its own status register (but cannot change the supervisor's status). In further alternative or additional embodiments, the workers can choose to read some status from one or more status registers of the supervisor (and again may change their own status later). E.g. again this could be to adopt a mode from the supervisor status register, such as a floating point mode or a rounding mode. In embodiments however, the supervisor cannot read any of the context registers CX0 . . . of the workers.

Each of the currently allocated worker threads W0 . . . W3 proceeds to perform the one or more computation tasks defined in the code specified by the respective run instruction. At the end of this, the respective worker thread then hands the time slot in which it is running back to the supervisor thread. This is achieved by executing an exit instruction ("EXIT").

The EXIT instruction takes at least one operand and preferably only a single operand, exit_state (e.g. a binary value), to be used for any purpose desired by the programmer to indicate a state of the respective codelet upon ending (e.g. to indicate whether a certain condition was met):

EXIT exit_state

The EXIT instruction acts on the scheduler 24 so that the time slot in which it is executed is returned back to the supervisor thread. The supervisor thread can then perform one or more subsequent supervisor tasks (e.g. barrier synchronization and/or exchange of data with external resources such as other tiles), and/or continue to execute another run instruction to allocate a new worker thread (W4, etc.) to the slot in question. Note again therefore that the total number of threads in the instruction memory 12 may be greater than the number that barrel-threaded processing unit 10 can interleave at any one time. It is the role of the supervisor thread SV to schedule which of the worker threads W0 . . . Wj from the instruction memory 12, at which stage in the overall program, are to be assigned to which of the interleaved time slots S0 . . . SM in the round robin schedule of the scheduler 24.

Furthermore, in embodiments the EXIT instruction may have a further special function, namely to cause the exit state specified in the operand of the EXIT instruction to be automatically aggregated (by dedicated hardware logic 37) with the exit states of a plurality of other worker threads being run through the same pipeline 13 of the same processor module 4 (e.g. same tile). Thus an extra, implicit facility is included in the instruction for terminating a worker thread.

Figure 5:
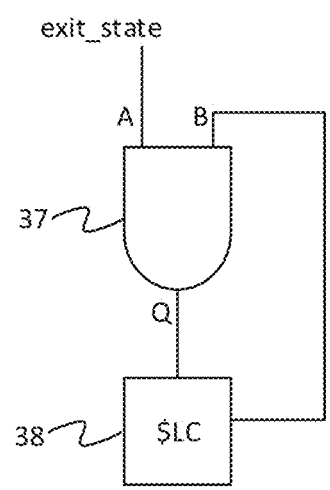
FIG. 5 is a schematic diagram of logic for aggregating exit states of multiple threads, FIG. 6 schematically illustrates synchronization amongst worker threads on the same tile.

An example circuit for achieving this is shown in FIG. 5. In this example, the exit states of the individual threads and the aggregated exit state each take the form of a single bit, i.e. 0 or 1. The processor module 4 comprises a "local consensus" ($LC) register 38 for storing the aggregated exit state of that processor module 4. In embodiments this local consensus register $LC 38 is one of the supervisor's status registers in the supervisor's context register file CXS. The logic for performing the aggregation may comprise an AND gate 37 arranged to perform a logical AND of (A) the exit state specified in the EXIT instructions' operand and (B) the current value in the local consensus register ($LC) 38, and to output the result (Q) back into the local consensus register $LC 38 as a new value of the local aggregate. However it will be appreciated that FIG. 5 is just one example and other forms of automated aggregation could be implemented, such as a Boolean OR (equivalent if the interpretation of 0 and 1 are inverted), or more complex circuitry for aggregating non-Booleans exit states. E.g. in embodiments the exit states may be trinary states.

At a suitable synchronization point in the program, the value stored in the local consensus register ($LC) 38 is initially reset to a value of 1. I.e. any threads exiting after this point will contribute to the locally aggregated exit state $LC until next reset. Every time an EXIT instruction is executed its exit state is aggregated with those that have gone before (since last reset). Thus by means of the arrangement shown in FIG. 5, the logic keeps a running aggregate of the exit states of any worker threads which have terminated by means of an EXIT instruction since the last time the local consensus register ($LC) 38 was reset. The reset of the aggregate in the local consensus register ($LC) 38 may be performed by the supervisor SV performing a PUT to the register address of the local consensus register ($LC) 38 using one or more general purpose instructions. Alternatively it is not excluded that the reset could be performed by an automated mechanism, for example triggered by executing the SYNC instruction described later herein.

The exit states can be used to represent whatever the programmer wishes, but one particularly envisaged example is to use an exit state of 1 to indicate that the respective worker thread has exited in a "successful" or "true" state, whilst an exit state of 0 indicates the respective worker thread exited in an "unsuccessful" or "false" state. E.g. the exit state of a thread may represent whether the error(s) in the one or more parameters of a respective node in the graph of a machine intelligence algorithm has/have fallen within an acceptable level according to a predetermined metric; or in a non-Boolean case, a degree of confidence in the result of the thread.

Whatever meaning is given by the programmer to the exit states, the supervisor thread SV can then get the aggregated value from the local consensus register ($LC) 38 to determine the aggregated exit state of all the worker threads that exited since it was last reset, for example at the last synchronization point, e.g. to determine whether or not all the workers exited in a successful or true state. In dependence on this aggregated value, the supervisor thread may then make a decision in accordance with the programmer's design; such as to report to the host processor 93H, or perform another iteration of the part of the program comprising the same worker threads.

Figure 6:
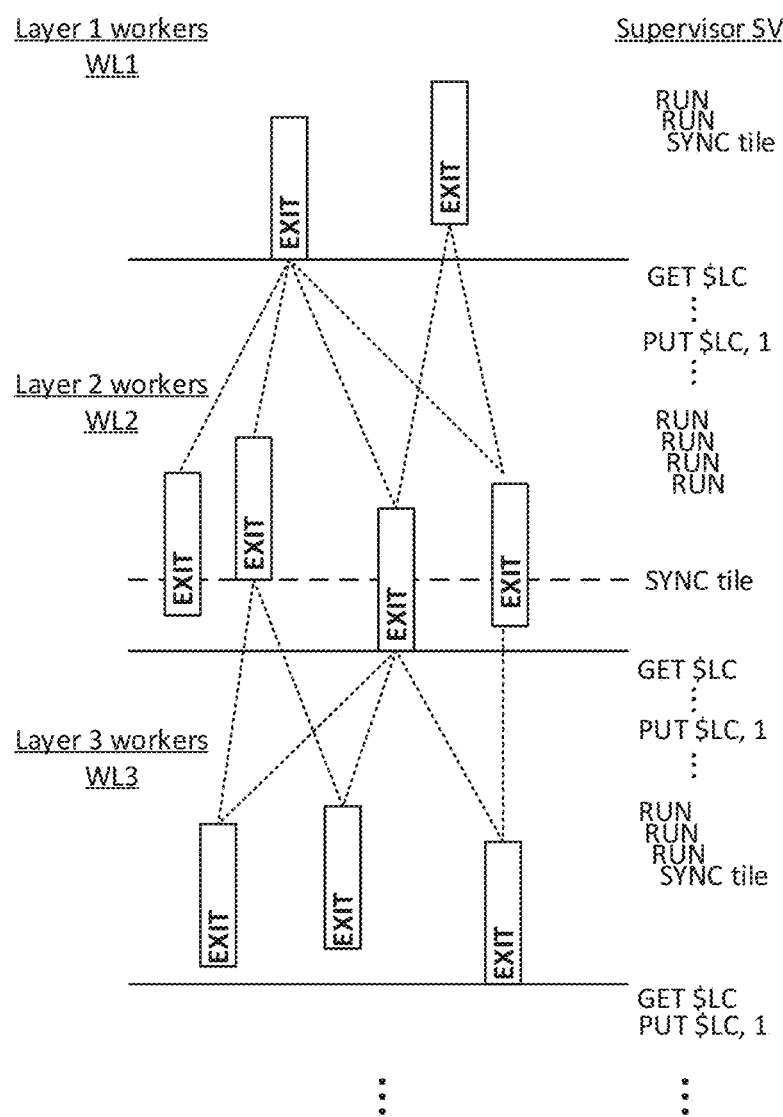

Referring to FIG. 6, in embodiments a SYNC (synchronization) instruction is provided in the processor's instruction set. The SYNC instruction has the effect of causing the supervisor thread SV to wait until all currently executing workers W have exited by means of an EXIT instruction. In embodiments the SYNC instruction takes a mode as an operand (in embodiments its only operand), the mode specifying whether the SYNC is to act only locally in relation to only those worker threads running locally on the same processor module 4, e.g. same tile, as the supervisor as part of which the SYNC is executed on (i.e. only threads through the same pipeline 13 of the same barrel-threaded processing unit 10); or whether instead it is to apply across multiple tiles or even across multiple chips.

SYNC mode //mode∈{tile, chip, zone_1, zone_2}

This will be discussed in more detail later but for the purposes of FIG. 6 a local SYNC will be assumed ("SYNC tile", i.e. a synchronization within a single tile).

The workers do not need to be identified as operands of the SYNC instruction, as it is implicit that the supervisor SV is then caused to automatically wait until none of the time slots S0, S1, . . . of the barrel-threaded processing unit 10 is occupied by a worker. As shown in FIG. 6, once each of a current batch of workers WLn have all been launched by the supervisor, the supervisor then executes a SYNC instruction. If the supervisor SV launches workers W in all the slots S0 . . . 3 of the barrel-threaded processing unit 10 (all four in the example illustrated, but that is just one example implementation), then the SYNC will be executed by the supervisor once the first of the current batch of worker threads WLn has exited, thus handing back control of at least one slot to the supervisor SV. Otherwise if the workers do not take up all of the slots, the SYNC will simply be executed immediately after the last thread of the current batch WLn has been launched. Either way, the SYNC causes the supervisor SV to wait for all others of the current batch of workers WLn−1 to execute an EXIT before the supervisor can proceed. Only after this the supervisor executes a GET instruction to get the content of the local consensus register ($LC) 38. This waiting by the supervisor thread is imposed in hardware once the SYNC has been executed. I.e. in response to the opcode of the SYNC instruction, the logic in the execution unit (EXU) of the execution stage 18 causes the fetch stage 14 and scheduler 24 to pause from issuing instructions of the supervisor thread until all outstanding worker threads have executed an EXIT instruction. At some point after getting the value of the local consensus register ($LC) 38 (optionally with some other supervisor code in between), the supervisor executes a PUT instruction to reset the local consensus register ($LC) 38 (in the illustrated example to 1).

As also illustrated in FIG. 6, the SYNC instruction may also be used to place synchronization barriers between different interdependent layers WL1, WL2, WL3, . . . of worker threads, where one or more threads in each successive layer is dependent on data output by one or more worker threads in its preceding layer. The local SYNC executed by the supervisor thread ensures that none of the worker threads in the next layer WLn+1 executes until all the worker threads in the immediately preceding layer WLn have exited (by executing an EXIT instruction).

As mentioned, in embodiments the processor module 4 may be implemented as one of an array of interconnected tiles forming a multi-tile processor, wherein each of tile may be configured as described above in relation to FIGS. 1 to 6.

Figure 7:
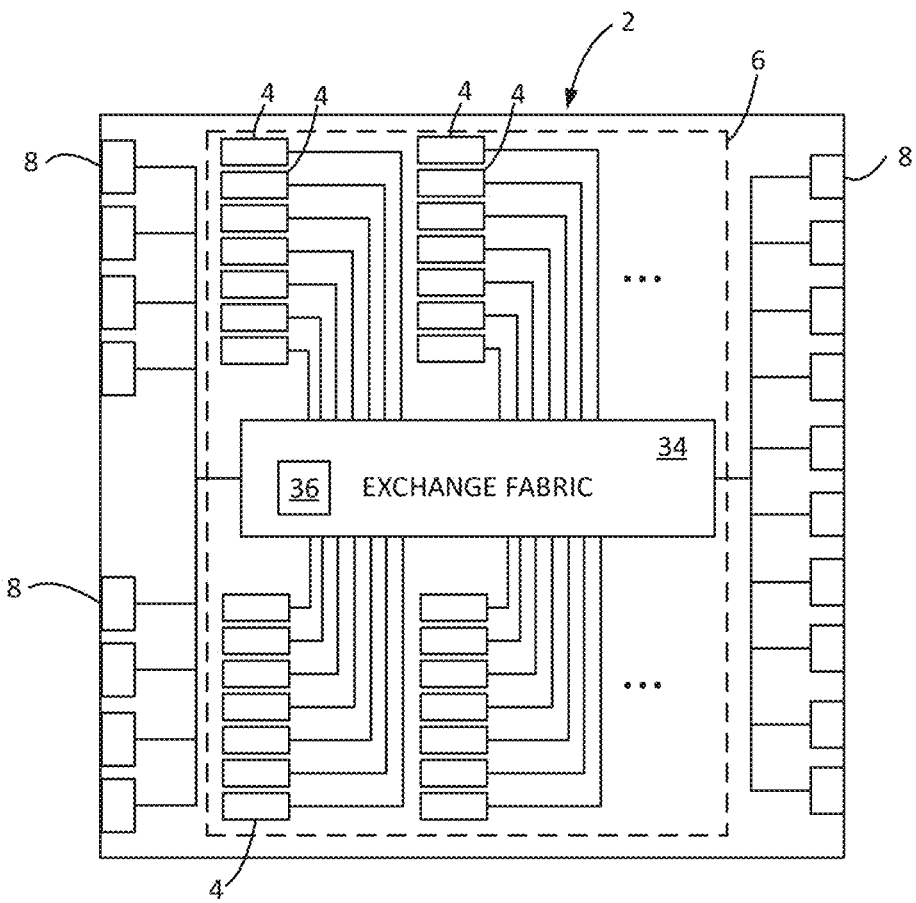
FIG. 7 is a schematic block diagram of a processor chip comprising multiple tiles.

This is illustrated further in FIG. 7 which shows a single chip processor 2, i.e. a single die, comprising an array 6 of multiple processor tiles 4 and an on-chip interconnect 34 connecting between the tiles 4. The chip 2 may be implemented alone on its own single-chip integrated circuit package, or as one of multiple dies packaged in the same IC package. The on-chip interconnect may also be referred to herein as the "exchange fabric" 34 as it enables the tiles 4 to exchange data with one another. Each tile 4 comprises a respective instance of the barrel-threaded processing unit 10 and memory 11, each arranged as described above in relation to FIGS. 1 to 6. For instance, by way of illustration the chip 2 may comprise of the order of hundreds of tiles 4, or even over a thousand. For completeness, note also that an "array" as referred to herein does not necessarily imply any particular number of dimensions or physical layout of the tiles 4.

In embodiments each chip 2 also comprises one or more external links 8, enabling the chip-2 to be connected to one or more other, external processors on different chips (e.g. one or more other instances of the same chip 2). These external links 8 may comprise any one or more of: one or more chip-to-host links for connecting the chip 2 to a host processor, and/or one or more chip-to-chip links for connecting together with one or more other instances of the chip 2 on the same IC package or card, or on different cards. In one example arrangement, the chip 2 receives work from a host processor (not shown) which is connected to the chip via one of the chip-to-host links in the form of input data to be processed by the chip 2. Multiple instances of the chip 2 can be connected together into cards by chip-to-chip links. Thus a host may access a computer which is architected as a single chip processor 2 or as multiple single chip processors 2 possibly arranged on multiple interconnected cards, depending on the workload required for the host application.

The interconnect 34 is configured to enable the different processor tiles 4 in the array 6 to communicate with one another on-chip 2. However, as well as there potentially being dependencies between threads on the same tile 4, there may also be dependencies between the portions of the program running on different tiles 4 in the array 6. A technique is therefore required to prevent a piece of code on one tile 4 running ahead of data upon which it is dependent being made available by another piece of code on another tile 4.

This may be achieved by implementing a bulk synchronous parallel (BSP) exchange scheme, as illustrated schematically in FIGS. 8 and 9.

According to one version of BSP, each tile 4 performs a compute phase 52 and an exchange phase 50 in an alternating cycle, separated from one to the other by a barrier synchronization 30 between tiles. In the case illustrated a barrier synchronization is placed between each compute phase 52 and the following exchange phase 50. During the compute phase 52 each tile 4 performs one or more computation tasks locally on-tile, but does not communicate any results of these computations with any others of the tiles 4. In the exchange phase 50 each tile 4 is allowed to exchange one or more results of the computations from the preceding compute phase to and/or from one or more others of the tiles in the group, but does not perform any new computations until it has received from other tiles 4 any data on which its task(s) has/have dependency. Neither does it send to any other tile any data except that computed in the preceding compute phase. It is not excluded that other operations such as internal control-related operations may be performed in the exchange phase. In embodiments the exchange phase 50 does not include any non-time-deterministic computations, but a small number of time-deterministic computations may optionally be allowed during the exchange phase 50. Note also that a tile 4 performing computation may be allowed during the compute phase 52 to communicate with other external system resources external to the array of tiles 4 being synchronized—e.g. a network card, disk drive, or field programmable gate array (FPGA)—as long as this does not involve communication with other tiles 4 within the group being synchronized. The communication external to the tile group may optionally utilise the BSP mechanism, but alternatively may not utilize BSP and may instead use some other synchronization mechanism of its own.

According to the BSP principle, a barrier synchronization 30 is placed at the juncture transitioning from the compute phases 52 into the exchange phase 50, or the juncture transitioning from the exchange phases 50 into the compute phase 52, or both. That is to say, either: (a) all tiles 4 are required to complete their respective compute phases 52 before any in the group is allowed to proceed to the next exchange phase 50, or (b) all tiles 4 in the group are required to complete their respective exchange phases 50 before any tile in the group is allowed to proceed to the next compute phase 52, or (c) both of these conditions is enforced. In all three variants it is the individual processors which alternate between phases, and the whole assembly which synchronizes. The sequence of exchange and compute phases may then repeat over multiple repetitions. In BSP terminology, each repetition of exchange phase and compute phase is sometimes referred to as a "superstep" (though note that in the literature the terminology is not always used consistently: sometimes each individual exchange phase and compute phase individually is called a superstep, whereas elsewhere, as in the terminology adopted herein, the exchange and compute phases together are referred to as a superstep).

Note also, it is not excluded that multiple different independent groups of tiles 4 on the same chip 2 or different chips could each form a separate respective BSP group operating asynchronously with respect to one another, with the BSP cycle of compute, synchronize and exchange being imposed only within each given group, but each group doing so independently of the other groups. I.e. a multi-tile array 6 might include multiple internally synchronous groups each operating independently and asynchronously to the other such groups (discussed in more detail later). In some embodiments there is a hierarchical grouping of sync and exchange, as will be discussed in more detail later.

FIG. 9 illustrates the BSP principle as implemented amongst a group 4 i, 4 ii, 4 iii of some or all of the tiles in the array 6, in the case which imposes: (a) a barrier synchronization from compute phase 52 to exchange phase 50 (see above). Note that in this arrangement, some tiles 4 are allowed to begin computing 52 whilst some others are still exchanging.

According to embodiments disclosed herein, this type of BSP may be facilitated by incorporating additional, special, dedicated functionality into a machine code instruction for performing barrier synchronization, i.e. the SYNC instruction.

In embodiments, the SYNC function takes this functionality when qualified by an inter-tile mode as an operand, e.g. the on-chip mode: SYNC chip.

Figure 10:
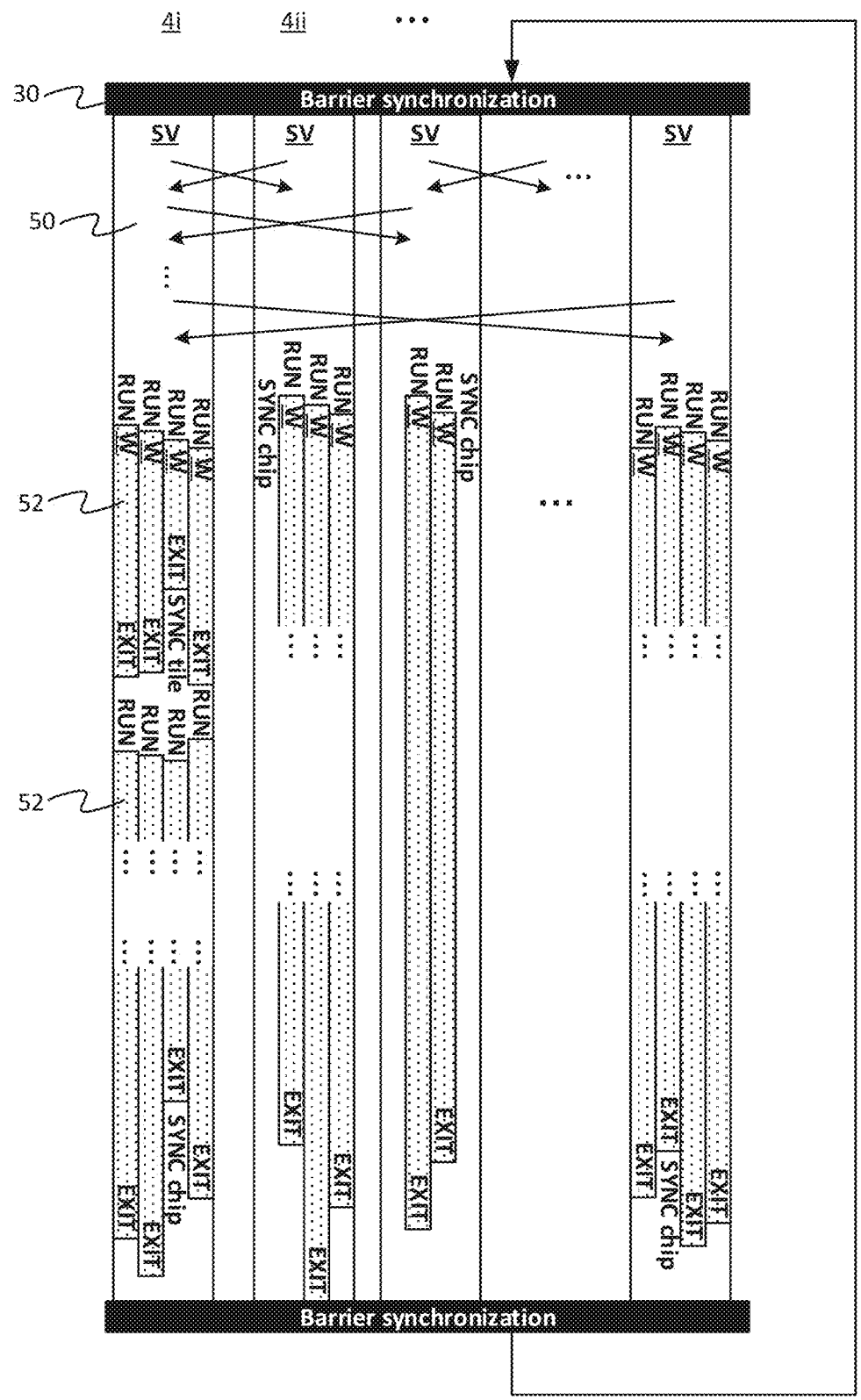
FIG. 10 is a schematic illustration of BSP between multi-threaded processing units.

This is illustrated schematically in FIG. 10. In the case where each tile 4 comprises a multi-threaded processing unit 10, then each tile's compute phase 52 may in fact comprise tasks performed by multiple worker threads W on the same tile 4 (and a given compute phase 52 on a given tile 4 may comprise one or more layers WL of worker threads, which in the case of multiple layers may be separated by internal barrier synchronizations using the SYNC instruction with the local on-tile mode as an operand, as described previously). Once the supervisor thread SV on a given tile 4 has launched the last worker thread in the current BSP superstep, the supervisor on that tile 4 then executes a SYNC instruction with the inter-tile mode set as the operand: SYNC chip. If the supervisor is to launch (RUN) worker threads in all the slots of its respective processing unit 10, the "SYNC chip" is executed as soon as the first slot that is no longer needed to RUN any more workers in the current BSP superstep is handed back to the supervisor. E.g. this may occur after the first thread to EXIT in the last layer WL, or simply after the first worker thread to EXIT if there is only a single layer.

Otherwise if not all the slots are to be used for running workers in the current BSP superstep, the "SYNC chip" can be executed as soon as the last worker that needs to be RUN in the current BSP superstep has been launched. This may occur once all the workers in the last layer have been RUN, or simply once all the worker threads have been RUN if there is only one layer.

The execution unit (EXU) of the execution stage 18 is configured so as, in response to the opcode of the SYNC instruction, when qualified by the on-chip (inter-tile) operand, to cause the supervisor thread in which the "SYNC chip" was executed to be paused until all the tiles 4 in the array 6 have finished running workers. This can be used to implement a barrier to the next BSP superstep. I.e. after all tiles 4 on the chip 2 have passed the barrier, the cross-tile program as a whole can progress to the next exchange phase 50.

Figure 11:
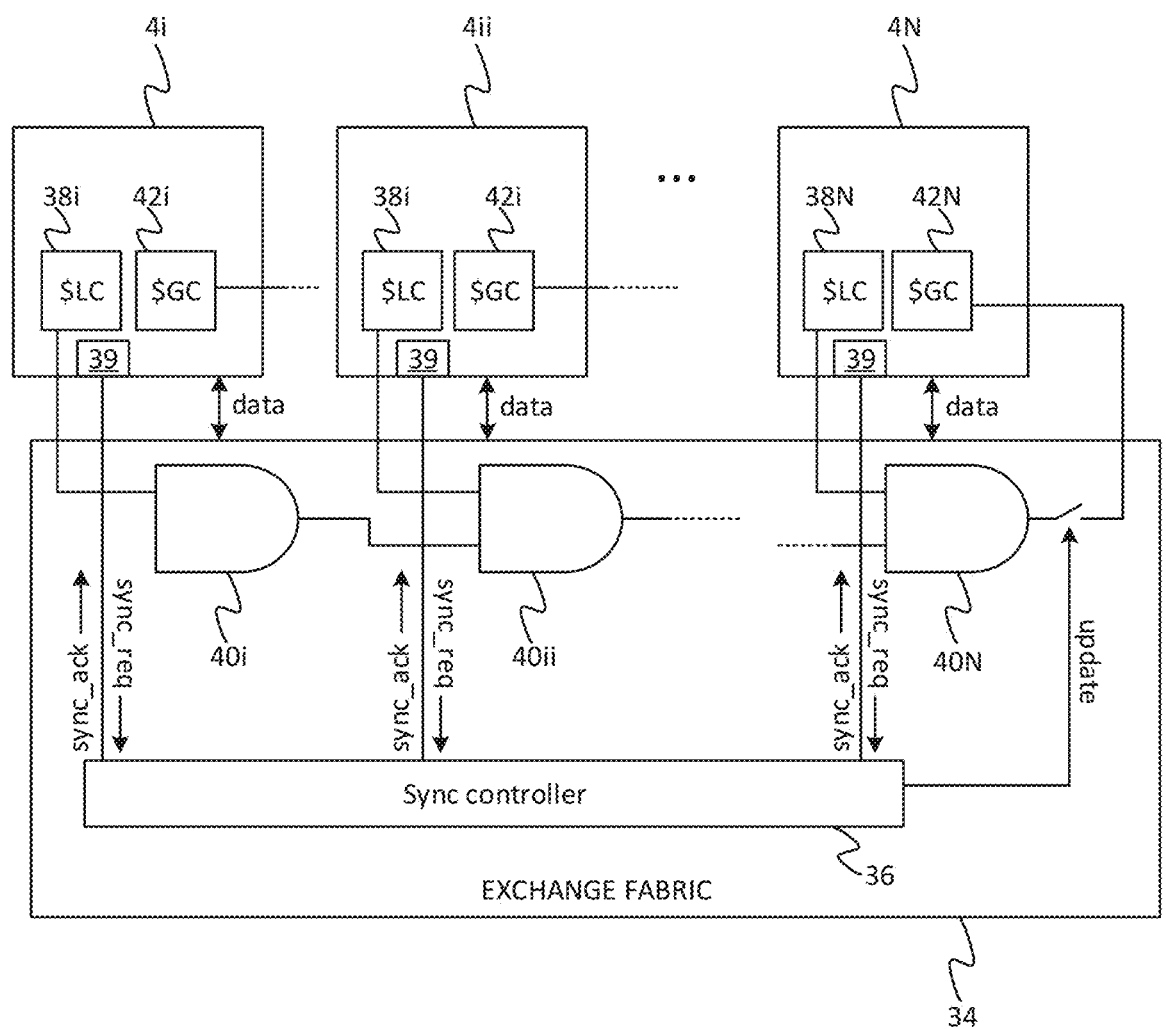
FIG. 11 is a schematic block diagram of an interconnect system.

FIG. 11 gives a schematic diagram illustrating the logic trigged by a "SYNC chip" according to embodiments disclosed herein.

Once the supervisor has launched (RUN) all of the threads it intends to in the current compute phase 52, it then executes a SYNC instruction with the on-chip, inter-tile operand: SYNC chip. This triggers the following functionality to be triggered in dedicated synchronization logic 39 on the tile 4, and in a synchronization controller 36 implemented in the hardware interconnect 34. This functionality of both the on-tile sync logic 39 and the synchronization controller 36 in the interconnect 34 is implemented in dedicated hardware circuitry such that, once the SYNC chip is executed, the rest of the functionality proceeds without further instructions being executed to do so.

Firstly, the on-tile sync logic 39 causes the instruction issue for the supervisor on the tile 4 in question to automatically pause (causes the fetch stage 14 and scheduler 24 to suspend issuing instructions of the supervisor). Once all the outstanding worker threads on the local tile 4 have performed an EXIT, then the sync logic 39 automatically sends a synchronization request "sync_req" to the synchronization controller 36 in the interconnect 34. The local tile 4 then continues to wait with the supervisor instruction issue paused. A similar process is also implemented on each of the other tiles 4 in the array 6 (each comprising its own instance of the sync logic 39). Thus at some point, once all the final workers in the current compute phase 52 have EXITed on all the tiles 4 in the array 6, the synchronization controller 36 will have received a respective synchronization request (sync_req) from all the tiles 4 in the array 6. Only then, in response to receiving the sync_req from every tile 4 in the array 6 on the same chip 2, the synchronization controller 36 sends a synchronization acknowledgement signal "sync_ack" back to the sync logic 39 on each of the tiles 4. Up until this point, each of the tiles 4 has had its supervisor instruction issue paused waiting for the synchronization acknowledgment signal (sync_ack). Upon receiving the sync_ack signal, the sync logic 39 in the tile 4 automatically unpauses the supervisor instruction issue for the respective supervisor thread on that tile 4. The supervisor is then free to proceed with exchanging data with other tiles 4 via the interconnect 34 in a subsequent exchange phase 50.

Preferably the sync_req and sync_ack signals are transmitted and received to and from the synchronization controller, respectively, via one or more dedicated sync wires connecting each tile 4 to the synchronization controller 36 in the interconnect 34.

Furthermore, in embodiments, an additional functionality may be included in the SYNC instruction. That is, at least when executed in an inter-tile mode (e.g. SYNC chip), the SYNC instruction also causes the local exit states $LC of each of the synchronized tiles 4 to be automatically aggregated by further dedicated hardware 40 in the interconnect 34. In the embodiment shown this logic 40 takes the AND of the local exits states. However, this is just one example, and in other embodiments the global aggregation logic 40 could e.g. take the Boolean OR, or a more complex combination of non-Boolean exit states.

In response to the synchronization request (sync_req) being received from all of the tiles 4 in the array 6, the synchronization controller 36 causes the output of the global aggregation logic 40 to be stored in a global consensus register ($GC) 42 on each tile 4. This register $GC 42 is accessible by the supervisor thread SV on the respective tile 4 once the supervisor instruction issue is resumed. In embodiments the global consensus register $GC is implemented as a control register in the supervisor's control register file CXS, 28 such that the supervisor thread can get the value in the global consensus register ($GC) 42 by means of a GET instruction.

The globally aggregated exit state $GC enables the program to determine an overall outcome of parts of the program running on multiple different tiles 4 without having to individually examine the state of each individual worker thread on each individual tile. It can be used for any purpose desired by the programmer, e.g. to determine whether or not the parts of the code running on all the tiles have all satisfied a predetermined condition, or an overall degree of confidence in the results of the tiles. In one example use case, the supervisor on one or more of the tiles may report to the host processor 93H if the global aggregate indicated a false or unsuccessful outcome. As another example, the program may perform a branch decision depending on the global exit state.

Figure 12:
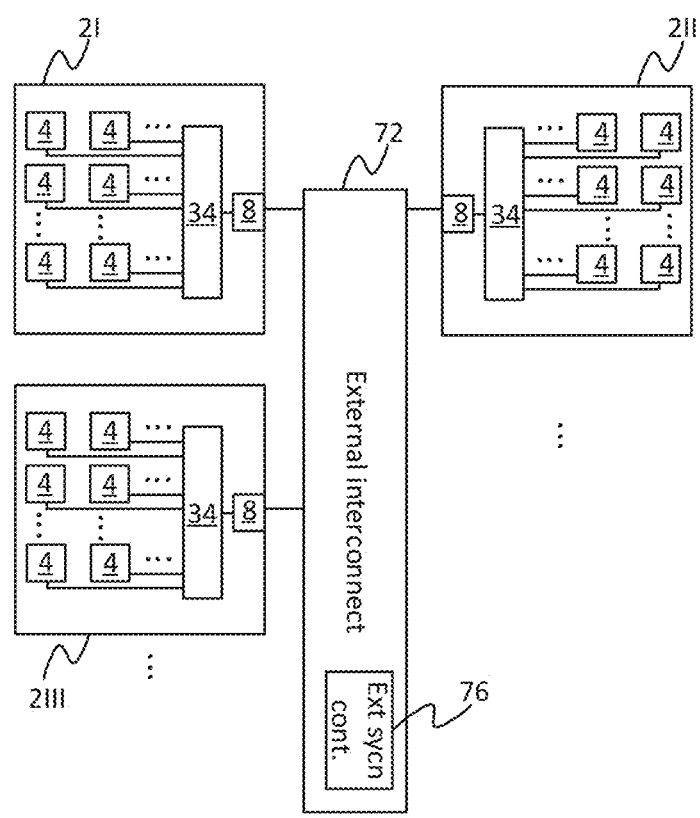
FIG. 12 is a schematic illustration of system of multiple interconnected processor chips.

As mentioned previously, in embodiments multiple instances of the chip 2 can be connected together to form an even larger array of tiles 4 spanning multiple chips 2. This is illustrated in FIG. 12. Some or all of the chips 2 may be implemented on the same IC package or some or all of the chips 2 may be implemented on different IC packages. The chips 2 are connected together by an external interconnect 72 (via the external links 8 shown in FIG. 7). This may connect between chips 2 on the same IC package, different IC packages on the same card, and/or different IC packages on different cards. As well as providing a conduit for exchange of data between tiles 4 on different chips, the external interconnect 72 also provides hardware support for performing barrier synchronization between the tiles 4 on different chips 2 and aggregating the local exit states of the tiles 4 on the different chips 2.

In embodiments, the SYNC instruction can take at least one further possible value of its mode operand to specify an external, i.e. inter-chip, synchronization: SYNC zone_n, wherein zone_n represents an external sync zone. The external interconnect 72 comprises similar hardware logic to that described in relation to FIG. 11, but on an external, inter-chip scale. When the SYNC instruction is executed with an external sync zone of two or more chips 2 specified in its operand, this causes the logic in the external interconnect 72 to operate in a similar manner to that described in relation to the internal interconnect 34, but across the tiles 4 on the multiple different chips 2 in the specified sync zone.

That is, in response to the opcode of the SYNC instruction whose operand specifies an external sync, the execution stage 18 causes the sync level specified by the operand to be signalled to dedicated hardware sync logic 76 in the external interconnect 72. In response to this, the sync logic 76 in the external interconnect conducts the process of synchronisation request (sync_req) and acknowledgment (sync_ack) to be performed only amongst all the external tiles 4 to which, e.g. all the tiles across all chips 2 in the system for a global sync. I.e. the sync logic 76 in the external interconnect 72 will return the sync acknowledgment signal (sync_ack) to the tiles 4 across chips 2 only once a synchronization request (sync_req) has been received from all the tiles 4 from those chips. All the tiles 4 on all those chips 2 will be automatically paused until the sync acknowledgment (sync_ack) from the external sync logic 76 is returned.

Thus, in response to an external SYNC, the supervisor instruction issue is paused until all tiles 4 on all chips 2 in the external sync zone have completed their compute phase 52 and submitted a sync request. Further, logic in the external interconnect 72 aggregates the local exit states of all these tiles 4, across the multiple chips 2 in the zone in question. Once all tiles 4 in the external sync zone have made the sync request, the external interconnect 72 signals a sync acknowledgment back to the tiles 4 and stores the cross-chip global aggregate exit state into the global consensus registers ($GC) 42 of all the tiles 4 in question. In response to the sync acknowledgement, the tiles 4 on all the chips 2 in the zone resume instruction issue for the supervisor.

Note that in embodiments the functionality of the interconnect 72 may be implemented in the chips 2, i.e. the logic may be distributed among the chips 2 such that only wired connections between chips are required (FIGS. 11 and 12 are schematic).

All tiles 4 within the mentioned sync zone are programmed to indicate the same sync zone via the mode operand of their respective SYNC instructions. In embodiments the sync logic 76 in the external interconnect 72 peripheral is configured such that, if this is not the case due to a programming error or other error (such as a memory parity error), then some or all tiles 4 will not receive an acknowledgement, and therefore that the system will come to a halt at the next external barrier, thus allowing a managing external CPU (e.g. the host) to intervene for debug or system recovery. Preferably however the compiler is configured to ensure the tiles in the same zone all indicate the same, correct sync zone at the relevant time. The sync logic may also be configured to take other alternative or additional measures in event of inconsistency in the modes indicated by the different SYNC instruction, e.g. raising an exception to the external CPU, and/or halting execution by some other mechanism.

Figure 14:
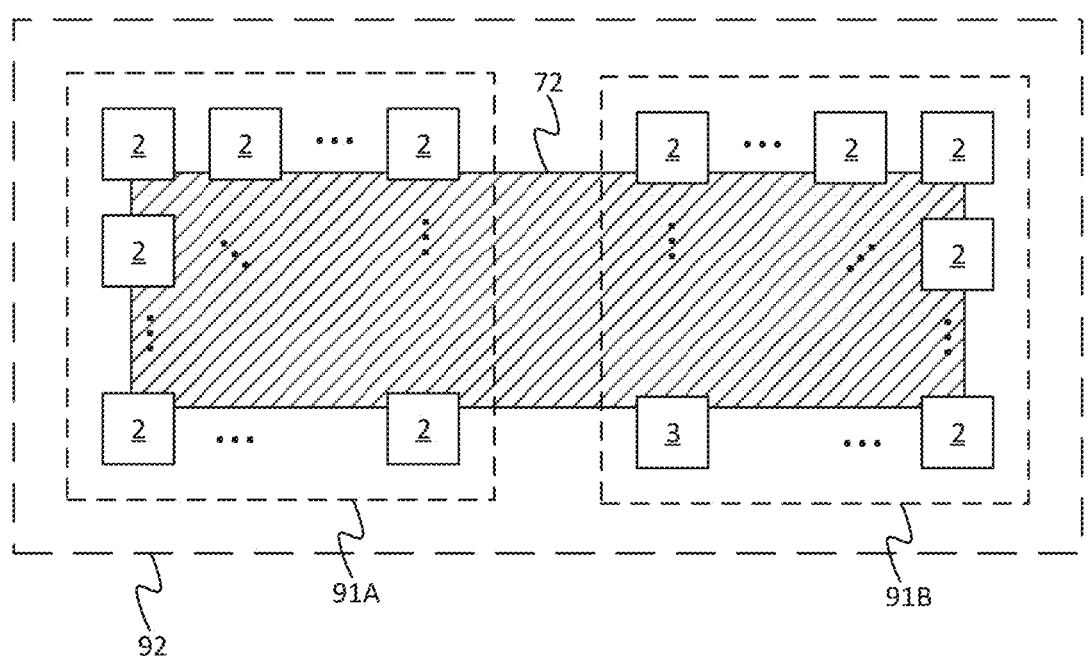
FIG. 14 is another schematic illustration of a system of multiple processor chips.

As illustrated in FIG. 14, in embodiments the mode of the SYNC instruction can be used to specify one of multiple different possible external sync zones, e.g. zone_1 or zone_2. In embodiments these correspond to different hierarchical levels. That is to say, each higher hierarchical level 92 (e.g. zone 2) encompasses two or more zones 91A, 91B of at least one lower hierarchical level. In embodiments there are just two hierarchical levels, but higher numbers of nested levels are not excluded. If the operand of the SYNC instruction is set to the lower hierarchical level of external sync zone (SYNC zone_1), then the above-described sync and aggregation operations are performed in relation to the tiles 4 on the chips 2 in only the same lower-level external sync zone as the tile on which the SYNC was executed. If on the other hand the operand of the SYNC instruction is set to the higher hierarchical level of external sync zone (SYNC zone_2), then the above-described sync and aggregation operations are automatically performed in relation to all the tiles 4 on all the chips 2 in the same higher-level external sync zone as the tile on which the SYNC was executed.

In response to the opcode of the SYNC instruction having an external sync zone as an operand, the execution stage 18 causes the sync level specified by the operand to be signalled to dedicated hardware sync logic 76 in the external interconnect 72. In response to this, the sync logic 76 in the external interconnect conducts the process of synchronisation request (sync_req) and acknowledgment (sync_ack) to be performed only amongst the tiles 4 of the signalled group. I.e. the sync logic 76 in the external interconnect 72 will return the sync acknowledgment signal (sync_ack) to the tiles in the signalled sync zone only once a synchronization request (sync_req) has been received from all the tiles 4 in that zone (but will not wait for any other tiles outside that zone if it is not a global sync).

Note that in other embodiments, the sync zones that can be specified by the mode of the SYNC instruction are not limited to being hierarchical in nature. In general, a SYNC instruction may be provided with modes corresponding to any kind of grouping. For instance, the modes may enable selection from amongst only non-hierarchical groups, or a mixture of hierarchical groupings and one or more non-hierarchical groups (where at least one group is not entirely nested within another). This advantageously enables the flexibility for the programmer or compiler, with minimal code density, to select between different layouts of internally-synchronous groups that are asynchronous with respect to one another.

Figure 18:
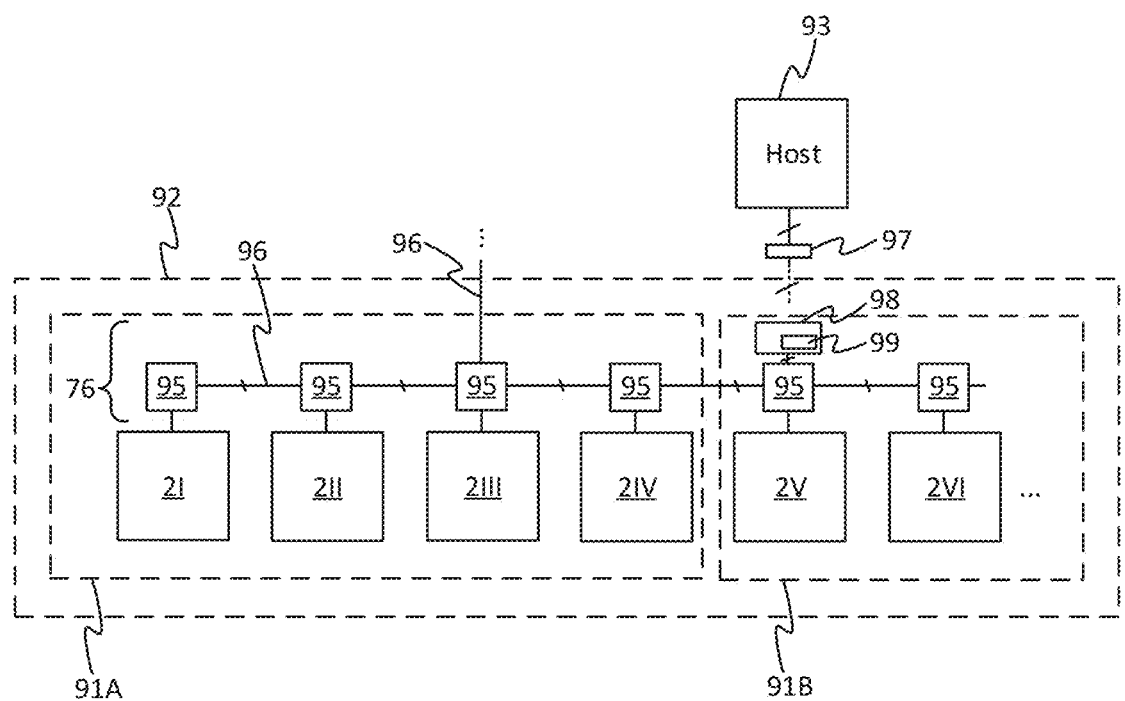
FIG. 18 illustrates example wiring for synchronizing between chips, and FIG. 19 schematically illustrates a flow control mechanism for external exchange, FIG. 20 schematically illustrates a program flow involving a host sync proxy.

An example mechanism for implementing the synchronization amongst the selected sync group 91, 92 is illustrated in FIG. 18. As illustrated, the external sync logic 76 in the external interconnect 72 comprises a respective sync block 95 associated with each respective chip 2. Each sync block 95 comprises respective gating logic and a respective sync aggregator. The gating logic comprises hardware circuitry which connects together the chips 2 in a daisy chain topology for the purpose of synchronization and exit state aggregation, and which propagates the sync and exit state information in accordance with the following. The sync aggregator comprises hardware circuitry configured to aggregate the synchronization requests (sync_req) and the exit states in accordance with the following.

The respective sync block 95 associated with each chip 2 is connected to its respective chip 2, such that it can detect the sync request (Sync_req) raised by that chip 2 and the exit state of that chip 2, and so that it can return the sync acknowledgment (Sync_ack) and global exit state to the respective chip 2. The respective sync block 95 associated with each chip 2 is also connected to the sync block 95 of at least one other of the chips 2 via a sync interface comprising one or more sync wires 96 (part of the sync network). Some of the chips' sync blocks 95 are connected to that of two adjacent chips 2, each connection via a respective instance of the sync interface 96. This way, the chips 2 can be connected in one or more daisy chains via their sync blocks 95. This enables the sync requests, sync acknowledgments, running aggregates of exit states, and global exit states, to be propagated up and down the chain.

In operation, for each sync group 91, 92, the sync block 95 associated with one of the chips 2 in that group is set as the master for synchronization and exit state aggregation purposes, the rest in the group being slaves for this purpose. Each of the slave sync blocks 95 is configured with the direction (e.g. left or right) that it needs to propagate sync requests, sync acknowledgments and exit states for each sync group 91, 92 (i.e. the direction toward the master). In embodiments these settings are configurable by software, e.g. in an initial configuration phase after which the configuration remains set throughout the subsequent operation of the system. For instance this may be configured by the host processor. Alternatively it is not excluded that the configuration could be hard-wired. Either way, the different sync groups 91, 92 can have different masters and in general it is possible for a given chip 2 (or rather its sync block 95) to be master of one group and not another group of which it is a member, or to be master of multiple groups.

For instance, by way of illustration consider the example scenario of FIG. 18. Say for the sake of example that the sync block 95 of chip 2IV is set as the master of a given sync group 91A. Consider now the first chip 2I in the chain of chips 2, connected via their sync blocks 95 and interface 96 ultimately to chip 2IV. When all the worker threads of the current compute phase on the first chip 2I have executed an EXIT instruction, and the supervisors on all the (participating) tiles 4 have all executed a SYNC instruction specifying the sync group 91A, then the first chip 2I signals its sync readiness to its respective associated sync block 95. The chip 2I also outputs to its respective sync block 95 its chip-level aggregated exit state (the aggregate of all the exiting workers on all the participating tiles on the respective chip 2I). In response, the sync block 95 of the first chip 2I propagates a sync request (Sync_req) to the sync block 95 of the next chip 2II in the chain. It also propagates the exit state of the first chip 2I to the sync block 95 of this next chip 2II. The sync block 95 of this second chip 2II waits until the supervisors of its own (participating) tiles 4 have all executed a SYNC instruction specifying the sync group 91A, causing the second chip 2II to signal sync readiness. Only then does the second chip's sync block 95 propagate a sync request to the sync block 95 of the next (third) chip 2III in the chain, and also propagates a running aggregate of the exit state of the first chip 2I with that of the second 2II. If the second chip 2II had become sync ready before the first 2I, then the sync block 95 of the second chip 2II would have waited for the first chip 2I to signal a sync request before propagating the sync request to the sync block 95 of the third chip 2III. The sync block 95 of the third chip 2III behaves in a similar manner, this time aggregating the running aggregate exit state from the second chip 2II to obtain the next running aggregate to pass onwards, etc. This continues toward the master sync block, that of chip 2IV in this example.

The sync block 95 of the master then determines a global aggregate of all the exit states based on the running aggregate it receives and the exit state of its own chip 2IV. It propagates this global aggregate back out along the chain to all the chips 2, along with the sync acknowledgement (Sync_ack).

If the master is part way along a chain, as opposed to being at one end as in the above example, then the sync and exit state information propagates in opposite directions either side of the master, both sides toward the master. In this case the master only issues the sync acknowledgment and global exit state once the sync request from both sides has been received. E.g. consider the case where chip 2III is master of group 92. Further, in embodiments the sync block 95 of some of the chips 2 could connect to that of three or more other chips 2, thus creating multiple branches of chains toward the master. Each chain then behaves as described above, and the master only issues the sync acknowledgment and global exit state once the sync request from all chains has been received. And/or, one or more of the chips 2 could connect to an external resource such as the host processor, a network card, a storage device or an FPGA.

Note that the above is only the mechanism for propagating sync and exit state information. The actual data (content) is transmitted by another channel, for example as discussed later with reference to FIG. 19. Further, it will be appreciated that this is only one example implementation, and the skilled person will be capable of building other circuits for implementing the disclosed synchronization and aggregation functionality once given the specification of that functionality disclosed herein.

Regardless of the particular mechanism for signalling sync and exit state information, in embodiments there is provided a mechanism for enabling a host processor or subsystem 93 to communicate with any work accelerator sub-system that operates with either a single point of rendezvous for all its participants (such as BSP), or in some embodiments a sufficiently small number of points of rendezvous (such as a number of independent BSP accelerators all connected to one host) such that implementation of a host-processor friendly synchronisation mechanism can be implemented in hardware in a particularly efficient manner. This situation may contrasted with a traditional CSP approach in which the number of points of rendezvous is application specific and thus the synchronization mechanisms such as semaphores must be software defined and thus subject to inefficiencies that follow from this (e.g. processor interrupt latency).

The host 93 here may represent a host processor or CPU 93H, e.g. as described in relation to FIG. 21; or a gateway processor of a wider host subsystem.

As shown in FIG. 18 (and referring also to FIG. 12), the overall system comprises at least one host processor 93, and an external host interface 97 for connecting the host processor 93 to the external interconnect 72 (including to the external sync logic 76). For example in embodiments the host interface 97 may take the form of a PCI interface. The sync logic 76 of the external interconnect 72 further comprises at least one "host sync proxy" (HSP) module 98. The HSP module 98 is connected between the interface 97 and one of the sync blocks 95. The HSP module 98 is arranged to act as a proxy on behalf of the host 93 for synchronization purposes, to enable the host processor 93 to participate in the synchronization amongst at least one of the sync zones or groups 91, 92, as will be discussed in more detail shortly.

In embodiments one HSP module 98 is provided per chip 2 and per corresponding sync block 95. In this case, whichever sync block 95 is configured as the master of a given sync group 91, 92, the HSP 98 of that sync block is set as the proxy of the host 93 within the group and the other HSPs are disabled. Thus as with the sync blocks 95, the HSPs 98 can be configured per sync group 91, 92. So one HSP 98 can be set as the host proxy for one sync group, e.g. 91A or 91B, whilst another HSP 98 can be set as the host proxy for another group, e.g. 91B or 92; or the same HSP 98 may be set as the host proxy for multiple groups, e.g. both 91 and 92. To this end the host interface 97 is connected to the HSPs 98 so that the HSP 98 selected for each group 91, 92 may be configurable by software by writing to registers of the HSP modules 98 via the PCI interface 97. Alternatively it is not excluded that the configuration could be hard-wired or the HSP registers updated via a different interface or protocol. It is also not excluded that in yet further alternative embodiments, there could be a single fixed HSP 98 per sync group 91, 92, or even a single fixed HSP 98 for the whole array or subsystem 6.

The or each host sync proxy (HSP) module 98 comprises hardware circuitry configured to enable the host 93 to participate in the respective sync group 91, 92 in which that HSP 98 is arranged to act as the host's proxy. A sync request emitted by the tiles 4, if it is a sync with host involvement, will be conveyed by the sync logic 95 to the active HSP 98 for that group whereas a sync request which does not specify host involvement will be aggregated and returned to the requesting tiles without involving the HSP 98 in any way. Thus the tiles 4 determine by virtue of the program they execute when, if at all, the accelerator requires to interact with the host via the HSP 98.

By way of illustration, consider an instance of the HSP 98 configured to act as proxy of the host 93 with respect to the global sync group 92. E.g. in FIG. 18, purely by way of illustration. It will be appreciated that analogous functionality can be described for the host's participation in any, lower level sync group also, such as those labelled 91.

The host 93 is asynchronous and non-time-deterministic with respect to the rest of the sync group 92, and separated by a relatively large amount of wiring and physical logic. In addition any communication with the host likely requires the host to take an interrupt following which there is a considerable latency for handling the interrupt and then switching contexts to the host code that would deal with the sync request. These factors mean the latency of any interaction involving the host 93 is poor. It would be desirable to avoid needing to communicate directly with the host 93 as much as possible.

To this end, the HSP 98 comprises a set of registers comprising at least one counter 99, and associated counting logic arranged to operate as follows. The counter 99 is arranged so that an integer value n can be written to it by the host 93 via the host interface 97, in embodiments such that the value written is added to the value already present in this register 99. The number in the counter 99 may be described as a number of credits, or a mark count (e.g. ipu_mark_count). When the HSP counter has a value of 1 or greater than in the sync group 92 in which the HSP 98 in question is acting as the host's proxy, the HSP 98 is then configured to generate a sync acknowledgement (sync_ack) when it receives a sync request from the tiles 4 in the sync group 92. The associated counting logic automatically decrements n by one in the counter 99 each time a sync acknowledgement is generated and the corresponding barrier is passed (e.g. barrier 80 in the case of sync group 92). This process occurs without the requirement for the HSP to contact or otherwise interrupt the host. But if the counter value n has now reached zero, the HSP does not generate the sync-acknowledge and therefore does not allow the tiles 4 in the group 92 to continue running again until both: i) all the tiles 4 in that group 92 have sent a sync request (sync_req), and ii) the HSP 98 performs a write to the HSP 98 via the host interface 97 explicitly granting the barrier to be released. In embodiments, this second subcondition ii) is implemented by the HSP 98 checking that the HSP counter 99 now has a value of 1 or greater—i.e. the counter has been granted with more credits again by the host 93 writing to the counter 99 via the host interface 97. Thus the tiles 4 of the group can be allowed to continue running through n barriers without deferring at all to the host 93, after which they must then synchronize with the host 93 (and may then exchange data to and/or from the host). See for example FIG. 20. In some cases, the host may arrange its operation for maximum efficiency by ensuring that the HSP counter value never falls to zero and thus the accelerator never pauses to sync with the host.

Preferably the software running on the tiles 4 is free to choose whether to request HSP involvement or not, by collectively marking their respective sync requests as either requiring or not requiring host involvement. In such embodiments the above behaviour is applied only by the HSP 98 for the barriers corresponding to sync requests marked as requiring host involvement (the "involvement" of the host for any given barrier being either the proxy granting of the sync ack by the HSP 98 on behalf of the host, or occasionally the explicit granting of more credit). The program is arranged so that all tiles 4 in a given group 91, 92 signal the same choice in their sync requests (HSP involvement or not) for a given barrier synchronization. In embodiments the host involvement is selected by different variants of the mode of the SYNC instruction. That is, for each sync group 91, 92, there is effectively two variants that the operand of the SYNC instruction can take: zone_1_host, zone_1_no_host; and zone_2_host, zone_2_no_host. The execution unit 18 is configured to act upon the operand, and in response to cause the synchronization logic in the interconnect 72, 76 to signal the host involvement marker accordingly. In other embodiments however, it is not excluded that other mechanisms could be implemented for requesting host involvement, or even (though less preferred) that host involvement is hard-wired and therefore always imposed (i.e. counter 99 is always consulted).

Another function of the HSP 98 is to notify the host by writing a notification message directly to the host's memory (in this embodiment, over the PCI interface). The notification message includes the current contents of the HSP 98 which includes the aforementioned counter value. Optionally the HSP 98 can also be configured to interrupt the host at this point. The host therefore has the option of waiting for an interrupt from the HSP or of polling the memory location written by the HSP with either method serving to alert the host to the current new state of the HSP including the value of its counter. The host program may then take such measures as it requires in order to prepare for future barriers following which it posts incremental values to the HSP counter.

In embodiments, preparation for barriers performed by the host may include the preparation of data to be fetched by the accelerator, such as experience data sets required by the accelerator for the next stage in learning a model. Preparation in this context may include fetching the data from storage disks or other media, formatting data in a form which is required by the training algorithm running on the accelerator or decompression of image data. Additionally, preparation for barriers may include consuming output data produced by the accelerator.

Another function of the HSP 98 is to communicate the exit state value of the accelerator that accompanies the sync request from the Tiles 4 to the host 93, via the notification message mentioned previously.

Another function of the HSP 98 is to allow the host program to specify its own exit state value by writing it to one of the HSP registers. Thereafter when the HSP 98 generates a sync-acknowledge for the tiles 4, the aggregated exit state of all the tiles 4 is also aggregated with the exit state value that has been provided by the host 93.

Another function of the HSP 98 is to allow the host program to specify an expected exit state value which corresponds to the exit state it most commonly expects the tiles 4 to provide along with their sync request. When the host 93 provides an expected exit state in this way, then so long as the tiles 4 exit state matches the value provided by the host the operation of the HSP is as described previously, with the HSP generating a sync-acknowledge while the HSP counter value n is greater than zero. Alternatively if the host's expected exit state value does not match the value provided by the tile 4 then the HSP 98 does not generate a sync-acknowledge to the Tiles 4. Because the tile's exit state 4 is provided during the notification write mentioned above and the accelerator will be stalled at the barrier where the tile exit state and host exit state differ, the host program is able to take such barrier preparation measures as may be required to satisfy the conditions signalled by the change in exit state and then re-establish the counter value n such that the value reflects the new preparations made. To facilitate this re-establishment of the counter value, the HSP interprets a write to the HSP register with a count value of zero as an instruction to zero the counter value rather than to increment the counter value by zero which would have the undesired effect of leaving the counter value unchanged.

An unexpected exit state event as described above may entail abandoning previous preparations made by the host in anticipation of the Tile exit state matching the expected value but in general the loss of efficiency resulting from this event is small compared to the loss of efficiency that would be incurred if the accelerator had to interrupt or involve the host directly at each barrier, so long as the occurrence of the unexpected exit state value is rare relative to occurrences of the expected exit state value.

N.B. an equivalent counter 99 for decrementing the number of credits could be implemented as a counter that starts at zero and then automatically increments up toward a target value held in a register. Other implementations may also be apparent to a person skilled in the art. By "decrement" herein, it is meant to refer to the underlying substantive effect of counting out a remaining number of automatically diminishing credits, rather than to refer to a particular implementation in terms of logical counting direction or such like.

In embodiments, the HSP 98 associated with each chip 2 comprises a plurality of instances of the counter 99 and the associated counting logic, one instance for each of some or all of the possible sync groups 91, 92 of which the respective chip can potentially be a member. Thus the HSP 98 can maintain a different number of sync credits for each of multiple sync groups 91, 92, e.g. multiple hierarchical levels. Alternatively a given HSP 98 only comprises one counter 99 for maintaining the sync credits for one sync group, but there are multiple HSPs each of which can be configured to act as described above in a different respective one of the groups 91, 92 (e.g. multiple hierarchical levels). For example as described above, in embodiments there is one HSP 98 per chip 2, each which can be attached to a given sync group 91, 92 by the host 93. In other alternatives, it is not excluded that there is only a single global HSP 98 with only a single counter 99 for maintaining a number of sync credits for a single sync group, e.g. the global group 92.

Also, in general, note that it is possible for the above arrangement to be applied to one or more host processors 93. For instance, one HSP 98 can be configured to involve one host processor 93 in one of the sync groups 91, 91, whilst another HSP may be configured to involve another host processor in another of the sync groups 91, 92. In this case each the HSP 98 of each host 93 represents its respective host 93 in relation to the respective sync group 91, 92 in a similar manner to that described above. Or in another example, in some embodiments it may be possible to involve two host processors 93 in the same sync group 91 or 92. In this case, a given HSP 98 may include a separate counter 99 for each host 93; or different HSPs 98 may be set for a given group, one for each host 93. Either way, the counters 99 are written with a respective number of sync credits by each respective host 93. When either counter 99 has decremented to zero a sync acknowledgement to the tiles 4 will not be issued.

As mentioned previously, not all tiles 4 need necessarily participate in the synchronization. In embodiments, as discussed, the group of participating tiles can be set by the mode operand of the sync instruction. However, this only allows for selection of predefined groups of tiles. It is recognized herein that it would also be desirable to be able to select sync participation on a tile-by-tile basis. Therefore in embodiments, there is provided an alternative or additional mechanism for selecting which individual tiles 4 participate in the barrier synchronization.

Particularly, this is achieved by providing an additional type of instruction in the processor instruction set, to be executed by one or some tiles 4 in place of the SYNC instruction. This instruction may be referred to as the "abstain" instruction, or "SANS" instruction (start automatic non-participatory sync). In embodiments the SANS is reserved for use by the supervisor thread. In embodiments it takes a single immediate operand:

SANS n_barriers

The behaviour of the SANS instruction is to cause the tile on which it is executed to abstain from the current barrier synchronization, but without holding up the other tiles which are waiting for all tiles in the specified sync group to SYNC. In effect it says "go on without me". When the SANS instruction is executed, the opcode of the SANS instruction triggers the logic in the execution unit of the execution stage 18 to send an instance of the synchronization request signal (Sync_req) to the internal and/or external sync controller 36, 76 (depending on the mode). In embodiments, the sync request generated by the SANS applies to any sync group 91, 92 that encompass the tile 4 that executed the SANS. I.e. for whatever sync group the tiles 4 in this local chip or chips are using next (they must agree on the sync group), the sync_req from those that have executed SANS will always be valid.

Thus from the perspective of the sync controller logic 36, 76 and the other tiles 4 in the sync group, the tile 4 executing the SANS instruction appears exactly as a tile 4 executing a SYNC instruction, and does not hold up the sync barrier and the sending of the sync acknowledgment signal (Sync_ack) from the sync logic 36, 76. I.e. the tiles 4 executing the SANS instead of the SYNC does not hold up or stall any of the other tiles 4 involved any sync group of which the tile in question is otherwise a member. Any handshake performed by a SANS is valid for all sync groups 91, 92.

However, unlike the SYNC instruction, the SANS instruction does not cause supervisor instruction issue to be paused awaiting the sync acknowledgment signal (Sync_ack) from the sync logic 36, 76. Instead the respective tile can simply continue uninhibited by the current barrier synchronization that is being conducted between the other tiles 4 that executed SYNC instructions. Thus by mimicking a sync but not waiting, the SANS instruction allows its tile 4 to press on with processing one or more tasks whilst still allowing the other tiles 4 to sync.

The operand n_barriers specifies the number of "posted" syncs, i.e. the number of future sync points (barriers) the tile will not be participating in. Alternatively it is not excluded that in other embodiments the SANS instruction does not take this operand, and instead each execution of the SANS instruction causes only a one-off abstention.

By means of the SANS instruction, certain tiles 4 may be responsible for performing tasks outside the direct scope of the BSP operating schedule. For example, it may be desirable to allocate a small number of tiles 4 within a chip 2 to initiate (and process) data transfers to and/or from host memory while the majority of tiles 4 are occupied with the primary computation task(s). In such scenarios those tiles 4 not directly involved with primary computation can declare themselves as effectively disconnected from the synchronization mechanism for a period of time using the automatic non-participatory sync feature (SANS). When using this feature, a tile 4 is not required to actively (i.e. via execution of the SYNC instruction) signal its readiness for synchronization (for any of the synchronization zones), and in embodiments makes a null contribution to the aggregated exit status.

The SANS instruction begins or extends a period during which the tile 4 on which it is executed will abstain from active participation in inter-tile synchronization (or synchronization with other external resources if they are also involved in the synchronization). During this period, this tile 4 will automatically signal its readiness for synchronization, within all zones, and in embodiments also make a null contribution to the global aggregated consensus $GC. This time period may be expressed as an unsigned immediate operand (n_barriers) indicating how many additional future synchronization points will be automatically signalled by this tile 4. Upon execution of the SANS, the value n_barriers specified by its operand is placed into a countdown register $ANS_DCOUNT on the respective tile 4. This is a piece of architectural state used to keep a track of how many additional future sync_reqs should be made. If the automatic non-participatory sync mechanism is currently inactive, the first assertion of readiness (sync request, sync_req) will be performed immediately. Subsequent assertions will occur in the background, once the previous synchronization has completed (i.e. following assertion of the sync acknowledgment, sync_ack). If the automatic non-participatory sync mechanism is currently active, the countdown counter register $ANS_DCOUNT will be updated in an automatic manner, such that no sync acknowledgment signal is left unaccounted for. The automatic non-participatory sync mechanism is implemented in dedicated hardware logic, preferably an instance of it in each tile 4, though in other embodiments it is not excluded that it could instead be implemented centrally for a group of tiles or all tiles.

With regard to the exit state behaviour, there are in fact a number of possibilities depending on implementation. In embodiments, to obtain the globally aggregated exit state, the sync logic 36, 76 only aggregates the local exit states from those tiles 4 in the specified sync group that executed a SYNC instruction, and not those that/those that executed a SANS instruction (the abstaining tile or tiles). Alternatively, the globally aggregated exit state is obtained by aggregating the local exit states from all the tiles 4 in the sync group that executed a SYNC and those that executed a SANS (both the participating and abstaining tiles 4). In the latter case, the local exit state output by the abstaining tile(s) 4 for global aggregation may be the actual locally aggregated exit state of that tile's workers at the time of executing the SANS, just as with the SYNC instruction (see description of local consensus register $LC 38). Alternatively the local "exit state" output by the abstaining tile 4 may be a default value, for instance the true value (e.g. logic 1) in embodiments where the exit state is binary. This prevents the abstaining tile 4 from interfering with the global exit state in embodiments where any false local exit state causes the global exit state to be false.

Regarding the return of the global exit state, there are two possibilities for this, regardless of whether or not the abstaining tile submits a local exit state for producing the global aggregate, and regardless of whether that value was an actual value or a default value. That is, in one implementation, the global aggregate exit state produced by the sync logic 36, 76 in the interconnect 34, 72 is stored only in the global consensus registers $GC 42 of the participating tiles 4, which executed a SYNC instruction, and not the abstaining tiles 4 which instead executed a SANS instruction. In embodiments, instead a default value is stored in the global consensus register $GX 42 of the tile(s) 4 that executed a SANS (the abstaining tiles). For instance this default value may be true, e.g. logic 1, in the case of a binary global exit state. In an alternative implementation however, the actual global aggregate produced by the sync logic 36, 76 is stored in the global consensus registers $GC 42 of both the participating tiles 4 which executed SYNC instructions and the abstaining tiles 4 which instead executed a SANS instruction. Thus all tiles in the group may still have access to the globally aggregated exit state.

Figure 13:
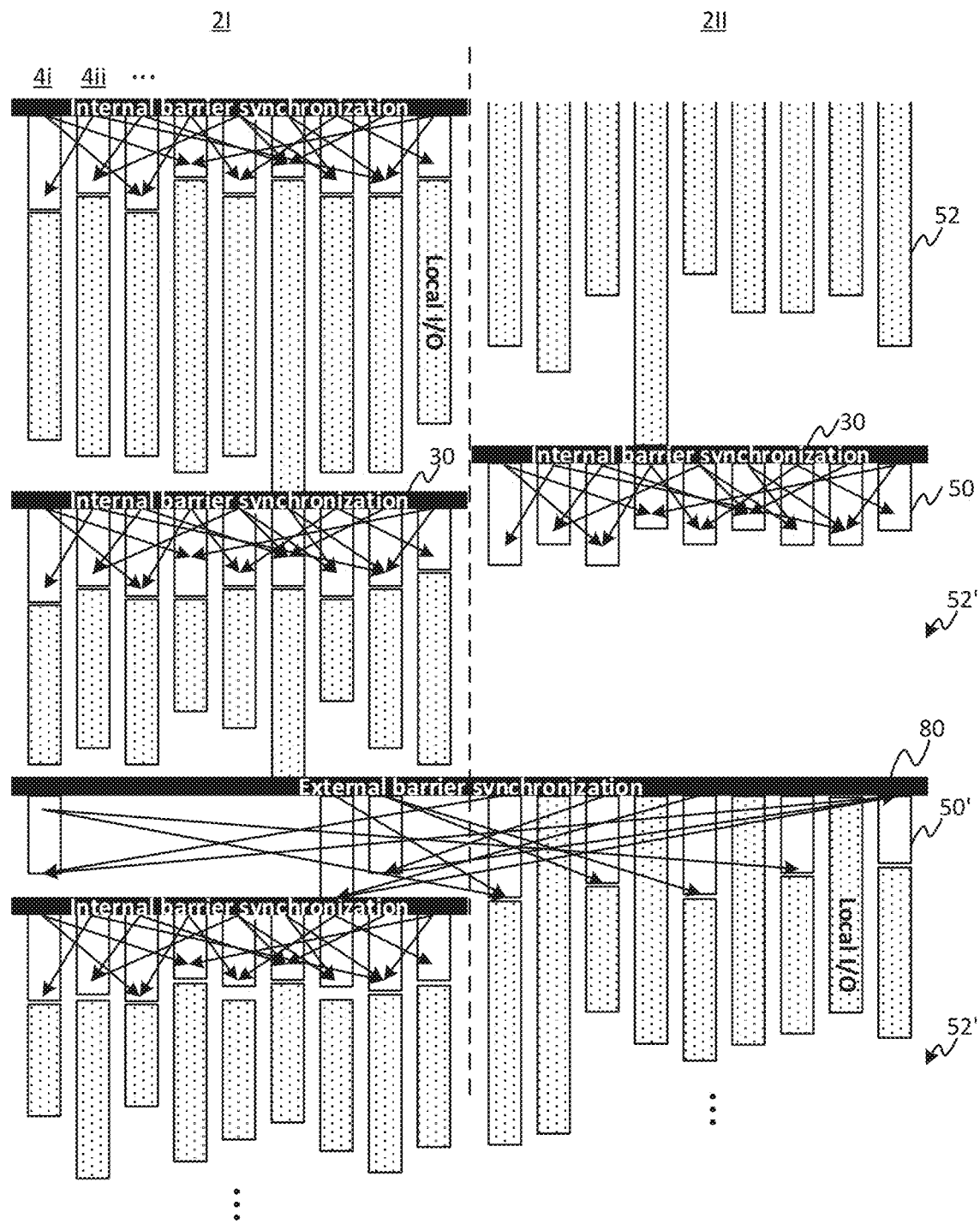
FIG. 13 is a schematic illustration of a multi-tier BSP scheme.

FIG. 13 illustrates an example BSP program flow involving both internal (on-chip) and external (inter-chip) synchronizations. As shown, the flow comprises internal exchanges 50 (of data between tiles 4 on the same chip 2) and the external exchanges 50' (of data between tiles 4 on different chips 2).

Figure 16:
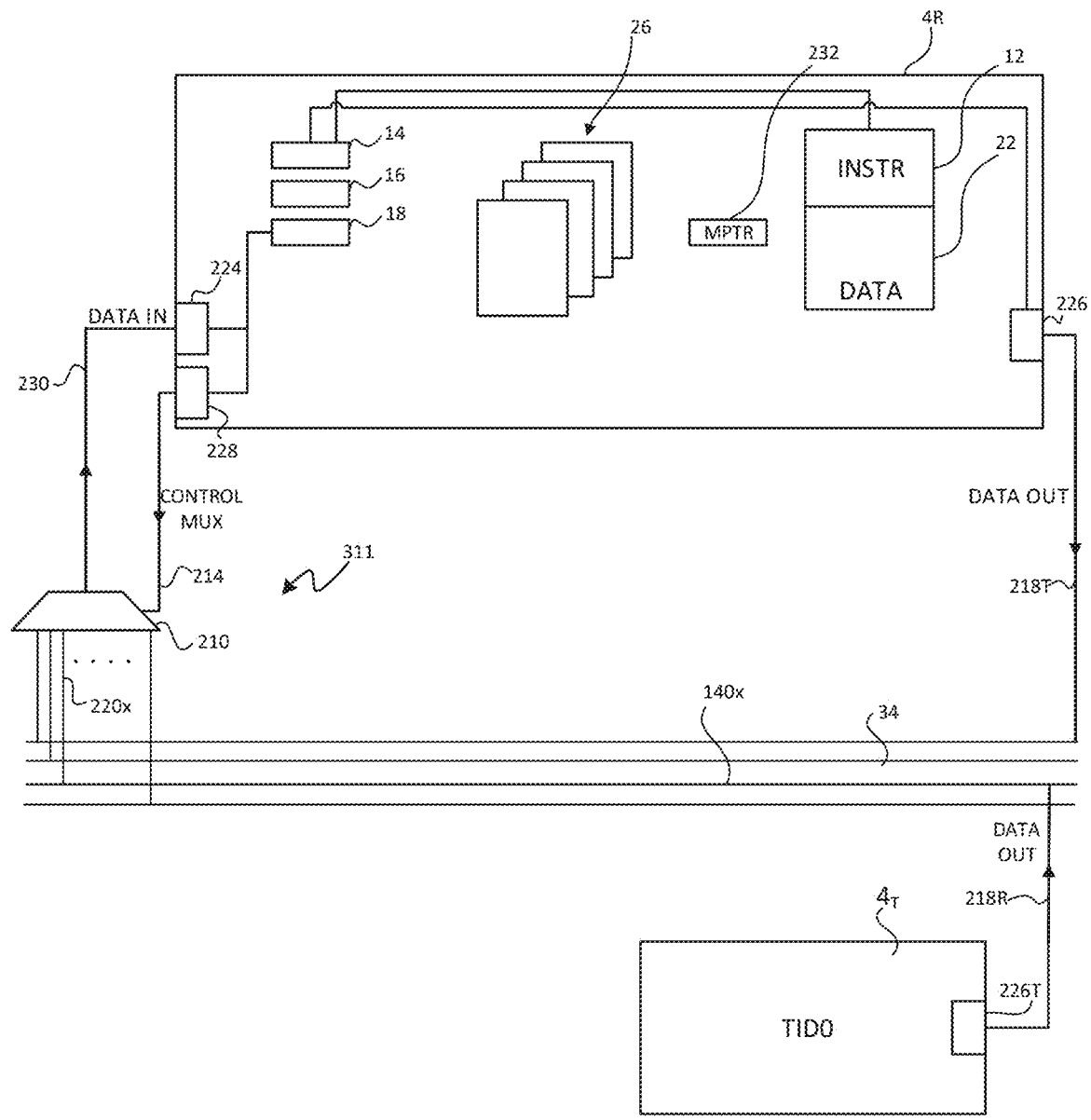

In embodiments, exchange of data via the internal (on-chip) interconnect 34 can be made time deterministic, as will be discussed in more detail shortly with reference to FIGS. 16 and 17; whereas exchange of data via an external interconnect 72 may be non-time-deterministic, e.g. due to a lossy physical channel which will require retransmission of messages. In general an external interconnect could be made time-deterministic but it may be difficult to do so or might confer too little advantage over a non-deterministic interconnect, and so may not be implemented in practice.

It may be desirable to keep the internal communications time deterministic so that they can be conducted without the need for queues in the internal interconnect 34, since queues would incur an undesirable silicon footprint in the interconnect 34. However, in embodiments external communications may not be time deterministic.

As will be discussed in more detail shortly, the communication without queues can be achieved by the compiler knowing the time at which each tile 4 transmits its data, and also knowing the on-chip inter-tile delay between the transmitting and receiving tile. Given this predetermined knowledge, the compiler can then program the receiving tile to listen to the address of the transmitting tile at a specific, known time after the transmission of the relevant data by the transmitting tile, i.e. the transmit time plus the inter-tile delay. The timing of the transmission is known by the compiler because the compiler itself selects at which point in each thread to include the send instruction(s). Further, the inter-tile delay, for on-chip communications, is a fixed knowable value for a given pair of transmitting and receiving tiles 4. The compiler may know this from a look-up table of inter-tile delays for different possible combinations of sending and receiving tiles. The compiler can then include the corresponding receive instruction, to listen to the sender's address, at the corresponding number of cycles after the transmit instruction.

A global synchronization and exchange across multiple chips will also be more "expensive" than for only an on-chip synchronization and exchange with the total cost being that of the aforementioned internal synchronization plus the additional delays required to aggregate this globally. Further, though in embodiments the sync signalling itself does not require flow control and is therefore relatively fast, the external synchronization syncs into an external exchange. An external exchange experiences longer latency and greater uncertainty versus an internal one.

Firstly, there is usually much less data bandwidth available inter-chip than on-chip. This is because inter-chip wiring density is limited by package connection (ball or pad) density which is much lower than the wiring density available on chip. So communicating a fixed amount of data between chips will take much longer than on-chip, even if transmission delays are similar. Also, external exchange is less local: wires reach further and hence are more capacitive, and more vulnerable to noise. This in turn may result in loss and hence the need for flow control mechanism which provides for retransmission at the physical layer, leading to reduced throughput (and loss of time determinism—see below). Further, as well as a greater physical distance, signalling and data transmitted between chips typically has to traverse greater amount of logic such as SerDes (serializers-deserializers) and flow control mechanisms, all of which adds extra delay compared to internal communications. For instance, the inventors have identified that using conventional technologies, an external barrier synchronization process can be expected to take of the order of ten times longer than an internal synchronization, and may account for 5-10% of the program running time. Using the hardware synchronization mechanism disclosed herein this can be reduced to the order of three times slower, but is still slower than an internal synchronization. Further, the exchange of data externally will, e.g. due to factors such as loss and retransmission at the physical layer due to noise, and/or serialization and deserialization between chips.

In other variants the interconnect between chips may be lossless at the physical and/or link layer, but is actually lossy at the higher networking layer due to contention of network layer flows between different sources and destinations causing queues to be over-flowed and packets dropped. This is how Ethernet works and it is envisaged that an alternative non-time-deterministic interconnect may employ Ethernet. Note also: it is the case that any exchange process, whether lossless or lossy, can actually suffer unrecoverable errors (e.g. due to alpha radiation) which result in total exchange failure and which cannot be recovered by any hardware mechanism (e.g. link layer). In both the time-deterministic cases and non-time-deterministic cases, in embodiments the system may detect but not correct such errors. Once detected, the error may be signalled to the host, whose strategy may be to require that the BSP application state be periodically checkpointed and in the event of such a fatal hardware error, rollback the state of the application to the last checkpoint. By this mechanism, even lossy mechanisms used to effect data exchanges can be made to appear lossless to the user, at some performance cost.

As illustrated in FIG. 13, in embodiments it is disclosed to keep the internal BSP supersteps (comprising the internal exchanges 50 of data between tiles 4 on the same chip 2) separate from the external sync and exchange (comprising the external exchanges 50' of data between tiles 4 on different chips 2).

Accordingly, the program may be arranged to perform a sequence of synchronizations, exchange phases and compute phases comprising in the following order: (i) a first compute phase, then (ii) an internal barrier synchronization 30, then (iii) an internal exchange phase 50, then (iv) an external barrier synchronization 80, then (v) an external exchange phase 50'. See chip 2II in FIG. 13. The external barrier 80 is imposed after the internal exchange phase 50, such that the program only proceeds to the external exchange 50' after the internal exchange 50. Note also that as shown with respect to chip 2I in FIG. 12, optionally a compute phase may be included between internal exchange (iii) and external barrier (iv).

This overall sequence is enforced by the program (e.g. being generated as such by the compiler). In embodiments the program is programmed to act in this way by means of the SYNC instruction described previously. The internal synchronization and exchange does not extend to any tiles or other entities on another chip 2. The sequence (i)-(v) (with the aforementioned optional compute phase between iii and iv) may be repeated in a series of overall iterations. Per iteration there may be multiple instances of the internal compute, sync and exchange (i)-(iii) prior to the external sync & exchange. I.e. multiple instances of (i)-(iii) (retaining that order), i.e. multiple internal BSP supersteps, may be implemented before (iv)-(v), i.e. the external sync and exchange. Note also, any of the tiles 4 may each be performing their own instance of the internal synchronization and exchange (ii)-(iii) in parallel with the other tiles 4.

Thus per overall BSP cycle (i)-(v) there is ensured to be at least one part of the cycle (ii)-(iii) wherein synchronization is constrained to being performed only internally, i.e. only on-chip.

Note that during an external exchange 50 the communications are not limited to being only external: some tiles may just perform internal exchanges, some may only perform external exchanges, and some may perform a mix. However, due to the loss of time determinism that occurs in the external interconnect 72 in some embodiments, then in such embodiments, once a tile has performed an external communication it cannot perform an internal communication again until the next synchronization (see below explanation of the preferred on-chip communication mechanism which relies on predetermined knowledge of message timing and inter-tile delays).

In some embodiments, also as shown in FIG. 13, some tiles 4 may perform local input/output during a compute phase, for example they may exchange data with a host. Note also that as shown in FIG. 13, it is in general possible for any or all tiles to have a null compute phase 52 or a null exchange phase 50 in any given BSP superstep.

In embodiments, the different levels of sync zones 91, 92 may be used to constrain the extent of some of the external sync & exchange operations to only a subgroup of the chips 2 in the system, and limit the number of times the penalty of a full, global sync and exchange is needed. That is, the overall cycle may comprise: (i) a first compute phase, then (ii) an internal barrier synchronization, then (iii) an internal exchange phase, then (iv) an external barrier synchronization 80 within the tiles of only a first, lower level sync zone 91; then (v) an external exchange phase between only the chips of the first sync zone 91; then (vi) an external barrier synchronization across a second, higher level sync zone 92; then (vii) an external exchange phase amongst the chips of the second level sync zone 92. The external barrier to the second level exchange phase is imposed after the first level external exchange phase, such that the program only proceeds to the second level external exchange after the first level exchange phase. This behaviour may be programmed by using the SYNC instruction qualified by different levels of the external mode in its operand.

In embodiments the highest hierarchical level of sync zone encompasses all the tiles 4 on all chips 2 in the array 6, i.e. it is used to perform a global sync. When multiple lower-level zones are used, BSP may be imposed internally amongst the group of tiles 4 on the chip(s) 2 within each zone, but each zone may operate asynchronously with respect to one another until a global sync is performed.

Note: with regard to the lower-level external synchronization and exchange (iv)-(v), any of the lower-level zones 91A, 91B may each be performing its own instance of the lower-level external exchange in parallel with the other lower-level zone(s). And/or, in some cases multiple instances of (i)-(v) may be implemented before (vi)-(vii), i.e. there may be multiple instances of the lower-level external BSP superstep before the external sync and exchange. Further, the scheme could be extended to three or more hierarchical levels of sync zone.

In general the host 93 may be involved in any one or more of the hierarchical levels of sync.

Figure 20:
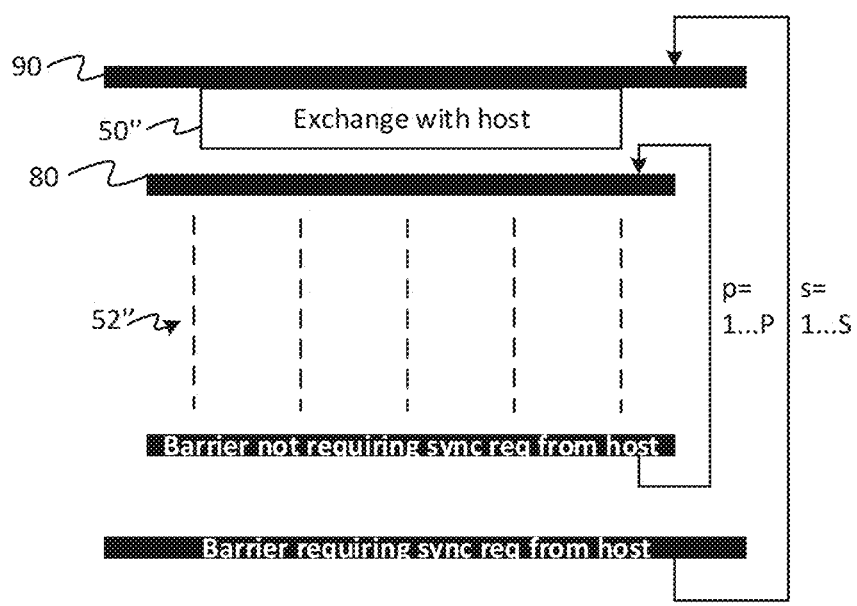

An example is illustrated schematically in FIG. 20 for the global sync zone 92. The system is allowed to perform a number P of BSP iterations p, passing through P sync barriers 80, before a barrier 90 also requiring sync acknowledgment from the host 93 is imposed. The P sync barriers require sync requests from all the (non abstaining) tiles 4 in the relevant sync group 92 but not the host 93. The subsequent sync barrier 80 requires sync requests from all the (non abstaining) tiles 4 in the sync group 92 and that the host 93 has previously indicated permission to pass the particular barrier. After this barrier 90 an exchange 50" may be performed between the host 93 and one or more of the tiles 4, e.g. for one or more of the tiles 4 to report computation results to the host 93.

In embodiments, exchange of data on-chip (internal exchange) may be performed in a time-deterministic manner without the need for queues. Reference is made to FIG. 16. The communication without queues can be achieved by the compiler knowing the time at which each tile 4 transmits its data, and also knowing the on-chip inter-tile delay between the transmitting and receiving tile. Given this predetermined knowledge, the compiler can then program the receiving tile to listen to the address of the transmitting tile at a specific, known time after the transmission of the relevant data by the transmitting tile, i.e. the transmit time plus the inter-tile delay. The timing of the transmission is known by the compiler because the compiler itself selects at which point in each thread to include the send instruction(s). Further, the inter-tile delay, for on-chip communications, is a fixed knowable value for a given pair of transmitting and receiving tiles 4. The compiler may know this from a look-up table of inter-tile delays for different possible combinations of sending and receiving tiles. The compiler can then include the corresponding receive instruction, to listen to the sender's address, at the corresponding number of cycles after the transmit instruction.

On each chip 2, the chip 2 comprises a respective clock which controls the timing of chip activity. The clock is connected to all of the chip's circuits and components. The chip 2 also comprises the internal, time-deterministic interconnect or "switching fabric" 34 to which all tiles and links are connected by sets of connection wires. In embodiments the interconnect 34 may be stateless, in that it has no state readable by software. Each set of connection wires is fixed end to end. The wires are pipelined. Each set can carry a packet consisting of one or more datums, with one datum being transferred per clock cycle. But note herein that the word "packet" denotes a set of bits representing a datum (sometimes referred to herein as a data item), perhaps with one or more valid bit. The "packets" do not have headers or any form of destination identifier (which permits an intended recipient to be uniquely identified), nor do they have end-of-packet information. Instead, they each represent a numerical value input to or output from a tile. Each tile has its own local memory (described later). The chip 2 has no shared memory. The switching fabric 24 constitutes a cross set of connection wires only and also does not hold any state. Data exchange between tiles on the same chip is conducted on a time deterministic basis as described herein. A pipelined connection wire comprises a series of temporary stores, e.g. latches or flip flops which hold datum for a clock cycle before releasing it to the next store. Time of travel along the wire is determined by these temporary stores, each one using up a clock cycle of time in a path between any two points.

Each tile 4 indicates its synchronisation state to the sync controller 36 in the internal interconnect 34. Once it has been established that each tile 4 is ready to send data, the synchronisation process 30 causes the system to enter the exchange phase 50. Note that each tile experiences the sync_ack with a different but known time delay. The supervisor program inserts additional cycle delays as required such that each tile begins its exchange phase on the exact same cycle. In this exchange phase, data values move between tiles (in fact between the memories of tiles in a memory-to-memory data movement). In the exchange phase, there are no computations and therefore no concurrency hazards (or at least there are no computations that reply on data yet to be received from another tile 4). In the exchange phase, each datum moves along the connection wires on which it exits a tile from a transmitting tile to its recipient tile. At each clock cycle, datum moves a certain distance along its path (store to store), in a pipelined fashion. When a datum is issued from a tile, it is not issued with a header identifying a recipient tile. Instead, the recipient tile knows that it will be expecting a datum from a certain transmitting tile at a certain time. Thus, the computer described herein is time deterministic.

Each tile 4 runs a portion of the program which has been allocated to it by the programmer or by a compiler exercise, where the programmer or the compiler function has knowledge of what will be transmitted by a particular tile at a certain time and what needs to be received by a recipient tile at a certain time. In order to achieve this, SEND instructions are included in the local programs executed by the processor on each tile, where the time of execution of the SEND instruction is predetermined relative to the timing of other instructions being executed on other tiles in the computer.

Each tile 4 is associated with its own multiplexer 210. Each multiplexer has at least as many inputs as there are tile 4 on the chip, each input being connected to the switching fabric 34. The cross wires of the switching fabric are connected to a data-out set of connection wires 218 from each tile (a broadcast exchange bus). For ease of illustration, not all crosswire are shown in FIG. 16. One set of crosswires is labelled 140x to indicate that it is one of a number of sets of crosswires.

When the multiplexer 210 is switched to the input labelled 220x then that will connect to the crosswires 140x and thus to the data bus 218T of the transmitting (sending) tile 4T. If the multiplexer is controlled to switch to that input at a certain time, then the datum received on the data bus 230 which is connected to the crosswire 140x will appear at the output of the multiplexer 210 at a certain time. It will arrive at the receiving tile 4R a certain delay after that, the delay depending on the distance of the multiplexer 210 from the receiving tile 4R. As the multiplexers tend to be arranged close to the switching fabric, the delay from the tile to the multiplexer can vary depending on the location of the receiving tile 4R.

To implement the switching, the local programs executed on the tiles 4 include switch control instructions (PUTi) which cause a multiplexer control signal 214 to be issued to control the multiplexer 210 associated with that tile to switch its input at a certain time ahead of the time at which a particular datum is expected to be received at the tile. In the exchange phase, multiplexers are switched and packets (data) are exchanged between tiles using the switching fabric. It can be seen from this explanation that the internal interconnect 34 has no state and requires no queues—the movement of each datum is predetermined by the particular crosswire to which the input of each multiplexer is connected.

In the exchange phase, all tiles 4 are permitted to communicate with all other tiles within its sync group. Each tile 4 has control of its own unique input multiplexer 210. Incoming traffic can thus be selected from any other tile in the chip 2 (or from one of the external connection links in an external exchange). It is also possible for a multiplexer 210 to be set to receive a null input, i.e. no input, in any given exchange phase.

Each tile 4 has three interfaces: an "exin" interface 224 which passes data from the switching fabric 34 to the tile 4; an "exout" interface 226 which passes data from the tile to the switching fabric over the broadcast exchange bus 218; and an "exmux" interface 228 which passes the control mux signal 214 (mux-select) from the tile 4 to its multiplexer 210.

In order to ensure each individual tile executes SEND instructions and switch control instructions at appropriate times to transmit and receive the correct data, exchange scheduling requirements need to be met by the programmer or compiler that allocates individual programs to the individual tiles in the computer. This function is carried out by an exchange scheduler, preferably at compile time, which needs to be aware of the following parameters.

Parameter I: the relative SYNC acknowledgement delay of each tile. This is a function of tile ID (TID) of the sending and receiving tiles, which is held in the TILE_ID register. This is a number of cycles always greater than or equal to 0 indicating when each tile receives the sync ack signal from the sync controller 36 relative to all other tiles. This can be calculated from the tile ID, noting that the tile ID indicates the particular location on the chip of that tile, and therefore reflects the physical distances. Put another way, the sync ack delays are equalized. If the transmitted tile 4T is closer to the sync controller 36 and the receiving tile 4R is further away, the consequence is that the sync acknowledgement delay will be shorter to the transmitting tile 4T than for the receiving tile 4R, and vice versa. A particular value will be associated with each tile for the sync acknowledgement delay. These values can be held for example in a delay table, or can be calculated on the fly each time based on the tile ID.

Parameter II: the exchange mux control loop delay. This is the number of cycles between issuing an instruction (PUTi MUXptr) that changes a tile's input mux selection and the earliest point at which the same tile could issue a (hypothetical) load instruction for exchange data stored in memory as a result of the new mux selection. This comprises the delay of the control signal getting from the exmux interface 228R of recipients tile 4R to its multiplexer 210R and the length of the line from the output of the multiplexer to the data input exin interface 224.

Parameter III: the tile to tile exchange delay. This is the number of cycles between a SEND instruction being issued on one tile and the earliest point at which the receiving tile could issue a (hypothetical) load instruction pointing to the sent value in its own memory. This can be calculated from the TIDs of the sending and receiving tiles, either by accessing a table, or by calculating on the fly. This delay includes the time taken for data to travel from transmit tile 4T from its exout interface 226T to the switching fabric 14 along its exchange bus 218T and then via the input mux 210R at the receiving tile 4R to the ex in interface 224R of the receiving tile.

Parameter IV: the exchange traffic memory pointer update delay. This is the number of cycles between issuing an instruction (PUTi MEMptr) that changes a tile's exchange input traffic memory pointer 232 and the earliest point at which that same tile could issue a (hypothetical) load instruction for exchange data stored in memory as a result of the new pointer. This is a small, fixed number of cycles. The memory pointer 232 acts as a pointer into the data memory 202 and indicates where incoming data from the exin interface 224 is to be stored.

Together these parameters give the total inter-tile delay that will be experienced between transmission of a datum from the transmitting tile 4T and receipt of that datum by the receiving tile 4R. The particular exchange mechanism and parameters above are given only by way of example. Different exchange mechanisms may differ in the exact composition of the delay, but as long as the exchange is kept time deterministic, then it can be known by the programmer or compiler and thus exchange without queues is possible.

Figure 17:
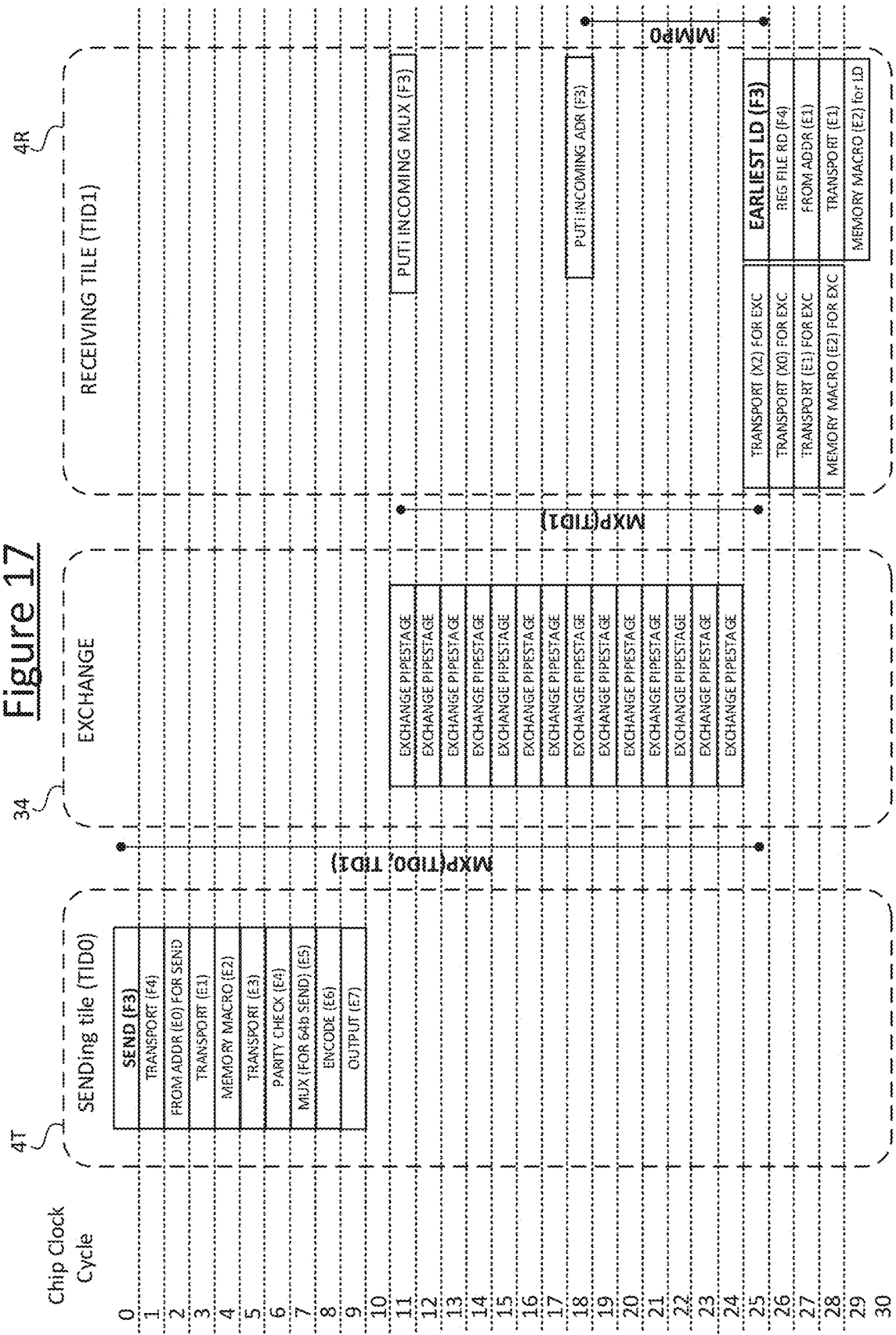

FIG. 17 shows the example exchange timings in more depth. On the left-hand side are shown the chip clock cycles running from 0-30. If the processor of the receiving tile 4R wants to act on a datum which was the output of a process on the transmitting tile 4T, then the transmitting tile 4T has to execute a SEND instruction send at a certain time (e.g. clock cycle 0 in FIG. 17), and the receiving tile 4R has to execute a switch control instruction PUTi EXCH MXptr (as in clock cycle 11) by a certain time relative to the execution of the SEND instruction on the transmitting tile. This will ensure that the data arrives at the recipient tile in time to be loaded for use in a code-let being executed at the recipient tile 4R.

Figure 19:
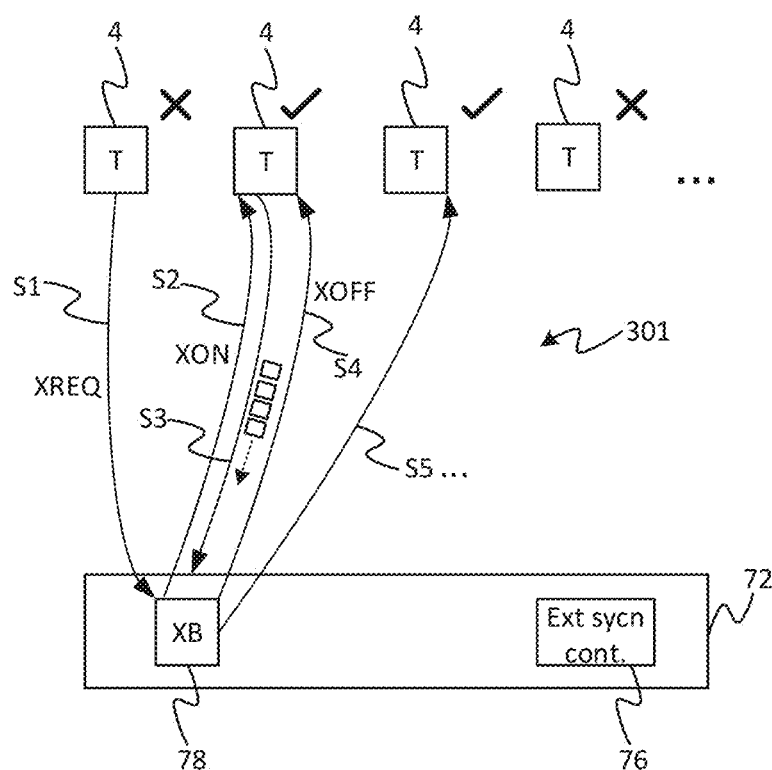

FIG. 19 illustrates an exemplary mechanism for communicating off-chip (external exchange). This mechanism is non-time-deterministic. The mechanism is implemented in dedicated hardware logic in the external interconnect 72. Data is sent over the external interconnect 72 in the form of packets. Unlike the packets sent over the internal interconnect, these packets have headers: as the order of transmission can change, they require the destination address to be present in the packet header. Also in embodiments the external interconnect 72 takes the form of a network and therefore requires additional information for routing purposes.

At the physical layer the interconnect mechanism is lossy, but at the transaction layer the mechanism is not lossy due to the architecture of the link layer: if a packet is not acknowledged it will be resent automatically by the hardware in the interconnect 72. The possibility for loss and resending at the data link layer however means that the delivery of data packets over the external interconnect is not time-deterministic. Further, all the packets of a given exchange may arrive together or separated apart in time, and in any order, so the external interconnect requires flow control and queuing. Further, the interconnect may use clock-data-recovery (CDR) technology to infer a clock from a received data stream having sufficient data signal transitions to maintain bit-lock. This inferred clock will be of unknown phase relationship to the sending clock and hence represent an additional source of non-determinism.

As illustrated, the external interconnect 72 comprises an external exchange block (XB) 78. The compiler nominates one of the tiles 4 to send an external exchange request (XREQ) to the exchange block 78 (operation S1). The XREQ is a message comprising one or more control packets, indicating which of the tiles 4 have data packets (content) to send to another tile or tiles 4 on another chip 2. This is illustrated schematically in FIG. 19 by the ticks and crosses: by way of an example scenario, those labelled with a tick have data packets to send externally and those labelled with a cross do not. In operation S2, the exchange block 78 sends an exchange-on (XON) control packet to a first of the tiles 4 with data to send externally. This causes the first tile to start sending its packets to the relevant destination via the external interconnect 78 (operation S3). If at any time the XB is unable to continue sending packets to the interconnect (e.g. due to a previous packet loss and re-transmission in the interconnect, or due to over-subscription of the external interconnect by many other XBs and tiles) the XB will send an exchange-off (XOFF) to that tile before the XBs queue overflows. Once the congestion is cleared and the XB again has sufficient space in its queue it will send an XON to the tile allowing it to continue transmitting its content. Once this tile has sent its last data packet, then in operation S4 the exchange block 78 sends an exchange-off (XOFF) control packet to this tile, then in operation S5 sends another XON to the next tile 4 with data packets to send, and so forth. The signalling of XON and XOFF are implemented as a hardware mechanism in dedicated hardware logic in the form of the external exchange block 78.

In embodiments the exchange block 78 may comprise a plurality of exchange block contexts. Each exchange block context is a piece of hardware logic for implementing a respective instance of the exchange mechanism described above. An exchange block context independently issues exchange-on and off to a subset of tiles configured to listen to that context. In this case an exchange block is a convenient grouping of contexts for physical layout, and for providing a bandwidth in terms of physical bus width to match that offered by the on-chip system-on-chip (SOC) interconnect 34 (the non-deterministic interconnect). For example an exchange block 78 may comprise four or eight exchange block contexts. Multiple blocks 78 may also be provided. Thus the external interconnect can process more exchanges in parallel. The division of the functionality divided between multiple exchange contexts and/or blocks is a matter of physical layout convenience and matching width/bandwidth with the SOC interconnect. However this is optional. In a chip 2 with just a few external links (e.g. just a host link and no chip-to-chip links), one could instead use just a single exchange block, or even an exchange block which has a single context.

An external exchange occurs whenever communication is required with a tile instance 4 within another chip 2 (e.g. another IPU), or a host system 93. The operation of external exchange differs significantly from internal exchange. Firstly, the external interconnect 72 is a shared resource, typically with much higher latency and lower bandwidth than that offered by the internal exchange fabric 34. Data transfers via external exchange are subject to arbitration and back-pressure and the associated latencies may be variable (i.e. cannot be statically determined). Secondly, exchanges of data are performed via transfer proxies (i.e. the exchange block contexts). A tile instance 4 communicates only with the on-chip proxies and never directly with the target of the transfer. Third, data transfers involve the formation of transaction packets in tile memory 22 and it is those packets which are used to communicate with the transfer proxies. The external exchange supports a number of synchronisation zones, which may have unique characteristics.

External exchange transmission involves the formation and transmission of transaction packets which are used to communicate with the on-chip transfer proxies. Such packets are formed in tile memory 22 by the tile 4, as per any other data structure and transmitted to a transfer proxy using send and/or send-off instructions (SEND, SENDOFF) following an external sync.

There is no restriction on the number of send instructions used to transmit a single transaction packet. A single send instruction cannot be used to transmit multiple packets. In one implementation the sendoff instruction has an enforced upper-limit for the data size of 64 words (256 bytes). An exception event will be raised when attempting to execute a sendoff instruction with a larger payload. Send instructions are subject to flow control and will stall at issue when flow-control is off.

One advantage of the disclosed mechanism is that no DMA engine is necessarily required for the tiles. Instead a (preferably small) subset of the tiles are nominated by the compiler as I/O tiles for sending and/or receiving data off-chip. Because the chip 2 comprises a high density of small tiles, some number can be allocated to I/O without compromising the performance of the rest of the tiles, thus obviating the argument for a DMA engine. Also the exchange mechanism is configured to service each of the multiple I/O tiles in turn to ensure that between the tiles the bandwidth of the external link (e.g. PCI or Ethernet) is made good use of, preferably saturated.

Hence in embodiments the processor chip 2 comprises at least no on-chip DMA. Regarding off-chip DMA, in some cases a gateway of the host subsystem 93 may have some DMA functionality, but in general this is used to move data from remote storage or CPU over an Ethernet network, which it then writes to the tiles 4. Alternatively, the data could be moved into gateway memory and then tiles could read it direct from there. For data moving the other way, the tiles write the data directly to the gateway memory, which then moves that data using DMA to remote host or storage separately. Even when the gateway writes data to the tiles, it is doing so in a BSP aware manner, so really the gateway function can be thought of as another kind of tile.

So in some cases the system may make use of some external DMA-like resource, but the reason is because that this type of DMA over Ethernet typically requires large networking stacks that cannot be run on the chip 2. The gateway may include one or more CPU cores which run those networking stacks, and which are armed with DMA units (as is the case with almost any general purpose processor). So the system still has essentially a non-DMA process between tiles and a pseudo-tile in the gateway, with an entirely decoupled DMA between gateway and remote host/storage.

Note: in embodiments the flow-control mechanism may be such that a tile instance 4 may receive a tail of superfluous flow-control (XFC) packets at the end of an external exchange transmit sequence. If these old, asynchronous flow-control packets arrive after the execution of a subsequent external SYNC instruction, a tile instance 4 may incorrectly deduce that it has permission to send further exchange data for the next exchange phase (the default setting of the tile transmit flow-control (XOFF) applied by the sync instruction may have been overridden by a subsequently received, late flow-control message). Therefore an internal SYNC may be used at the end of an external exchange transmit sequence in order to allow time for any old flow-control packets to propagate. This will ensure that the XB exchange bus is quiet prior to beginning a new external exchange transmission (which begins with the execution of a subsequent, external SYNC).

With regard to the XREQ packets, the on-chip exchange block contexts are used to arbitrate the external exchange resources between a fixed group of tile instances 4 and to orchestrate the flow-control for that group. For any external sync, each tile instance 4 may declare itself a master for that group, or a slave, using the appropriate argument to SYNC.

The difference between a master and slave is small but in embodiments is relevant for the operation of external exchange. At the beginning of an external exchange sequence, the flow-control mechanism prevents each tile 4 from transmitting exchange packets. However the protocol specifies that an XREQ packet be sent to each exchange block context that is to participate in the external exchange, with the XREQ packet specifying which tile instances 4 in the group have data to send. The exchange block context will then control the arbitration between the participating tiles 4. Master tile instances are endowed with the ability to execute a single send or sendoff instruction following execution of an external SYNC which ignores the flow-control setting. This allows those master tiles to force send an XREQ packet to its exchange block context in order to kick-start that context.

Only one tile instance 4 per group should be designated as the master although in embodiments there is no explicit checking for this. Each exchange block context is preconfigured with the ID of the tile 4 designated as the master for that group. If the exchange block context receives an XREQ packet from a different tile 4 then an error will be raised by the exchange block 78.

In embodiments the execution sync instructions, with one of the external slave enumerations, will force a reset of the local tile flow-control status to its default setting (XOFF).

Receive for external exchange differs significantly from that for internal exchange. When operating in external receive mode, the exchange interface 311 receives and interprets transaction packets from the on-chip exchange proxies. Those packets include metadata that specify the type of transaction and in the case of writes, a tile memory start address and payload length. For incoming writes, only the actual data payloads are committed to tile memory, with all metadata being stripped off by the exchange interface 311.

The CSR state $INCOMING_MUX is relevant to external exchange. It is used to configure the incoming data multiplexer 210, in order to sample the data from the designated sender. Each tile instance 4 has its own, unique input multiplexer 210 allowing the selection of traffic from any tile within the IPU (for Internal Exchange), or from an exchange block 78 (for external exchange). This value must be within the range associated with external exchange (i.e. explicitly pointing at a transfer proxy) for the exchange interface 311 to operate in external exchange mode. In embodiments the NULL range is not a valid range for external exchange.

Note that in embodiments, there is no flow control mechanism by which the tile 4 can indicate to the exchange block 78 that the exchange block is permitted to send to the tile, and nor is this required. This is because the tile 4 is capable, by design, of always consuming everything that is sent to it. If this were not the case then such a reverse direction flow control would be required. This capability of the tile 4 arises firstly from the requirement it has in the time-deterministic mode to never block receipt (flow control cannot be employed in a time-deterministic system), and secondly from the fact that there is no concept of a queue in the tile since the compiler has knowledge of how much memory space the receiving tile has for new messages at the beginning of each exchange and arranges data transfers such that this memory allocated for messages in a given exchange is never over-subscribed.

Figure 15:
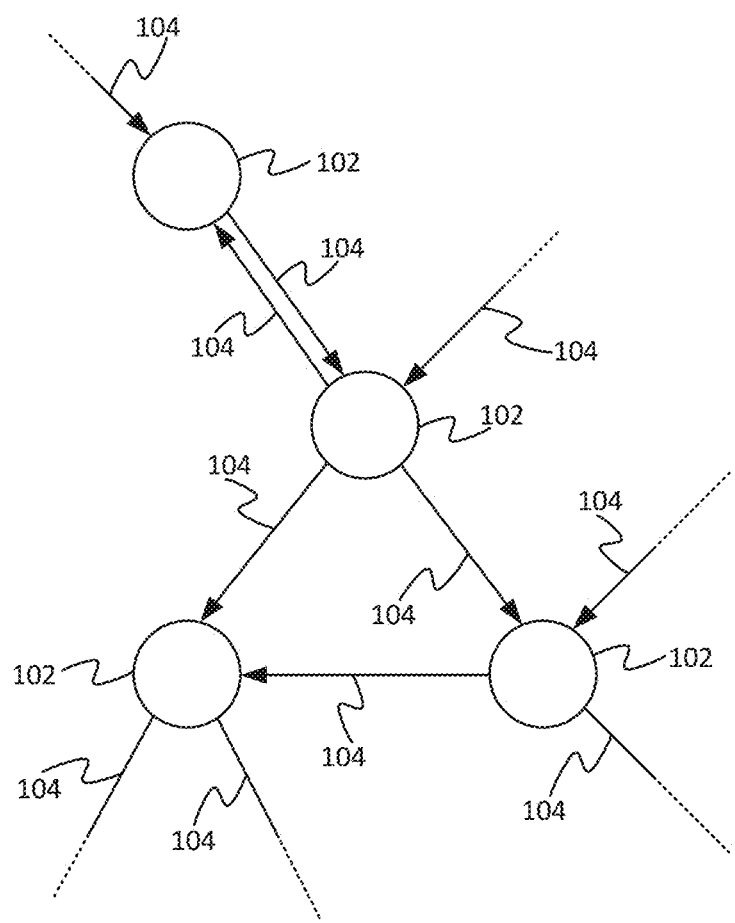
FIG. 15 is a schematic illustration of a graph used in a machine intelligence algorithm, FIG. 16 schematically illustrates an arrangement for exchanging data between tiles, FIG. 17 schematically illustrates a scheme of exchange timings.

FIG. 15 illustrates an example application of the processor architecture disclosed herein, namely an application to machine intelligence.

As will be familiar to a person skilled in the art of machine intelligence, machine intelligence begins with a learning stage where the machine intelligence algorithm learns a knowledge model. The model comprises a graph of interconnected nodes (i.e. vertices) 102 and edges (i.e. links) 104. Each node 102 in the graph has one or more input edges and one or more output edges. Some of the input edges of some of the nodes 102 are the output edges of some others of the nodes, thereby connecting together the nodes to form the graph.

Further, one or more of the input edges of one or more of the nodes 102 form the inputs to the graph as a whole, and one or more of the output edges of one or more of the nodes 102 form the outputs of the graph as a whole. Sometimes a given node may even have all of these: inputs to the graph, outputs from the graph and connections to other nodes. Each edge 104 communicates a value or more often a tensor (n-dimensional matrix), these forming the inputs and outputs provided to and from the nodes 102 on their input and output edges respectively.

Each node 102 represents a function of its one or more inputs as received on its input edge or edges, with the result of this function being the output(s) provided on the output edge or edges. Each function is parameterized by one or more respective parameters (sometimes referred to as weights, though they need not necessarily be multiplicative weights). In general the functions represented by the different nodes 102 may be different forms of function and/or may be parameterized by different parameters.

Further, each of the one or more parameters of each node's function is characterized by a respective error value. Moreover, a respective condition may be associated with the error(s) in the parameter(s) of each node 102. For a node 102 representing a function parameterized by a single parameter, the condition may be a simple threshold, i.e. the condition is satisfied if the error is within the specified threshold but not satisfied if the error is beyond the threshold. For a node 102 parameterized by more than one respective parameter, the condition for that node 102 having reached an acceptable level of error may be more complex. For example, the condition may be satisfied only if each of the parameters of that node 102 falls within respective threshold. As another example, a combined metric may be defined combining the errors in the different parameters for the same node 102, and the condition may be satisfied on condition that the value of the combined metric falls within a specified threshold, but otherwise the condition is not satisfied if the value of the combined metric is beyond the threshold (or vice versa depending on the definition of the metric). Whatever the condition, this gives a measure of whether the error in the parameter(s) of the node falls below a certain level or degree of acceptability. In general any suitable metric may be used. The condition or metric may be the same for all nodes, or different for different respective ones of the nodes.

In the learning stage the algorithm receives experience data, i.e. multiple data points representing different possible combinations of inputs to the graph. As more and more experience data is received, the algorithm gradually tunes the parameters of the various nodes 102 in the graph based on the experience data so as to try to minimize the errors in the parameters. The goal is to find values of the parameters such that the output of the graph is as close as possible to a desired output for a given input. As the graph as a whole tends toward such a state, the graph is said to converge. After a suitable degree of convergence the graph can then be used to perform predictions or inferences, i.e. to predict an outcome for some given input or infer a cause for some given output.

The learning stage can take a number of different possible forms. For instance, in a supervised approach, the input experience data takes the form of training data, i.e. inputs which correspond to known outputs. With each data point, the algorithm can tune the parameters such that the output more closely matches the known output for the given input. In the subsequent prediction stage, the graph can then be used to map an input query to an approximate predicted output (or vice versa if making an inference). Other approaches are also possible. For instance, in an unsupervised approach, there is no concept of a reference result per input datum, and instead the machine intelligence algorithm is left to identify its own structure in the output data. Or in a reinforcement approach, the algorithm tries out at least one possible output for each data point in the input experience data, and is told whether this output is positive or negative (and potentially a degree to which it is positive or negative), e.g. win or lose, or reward or punishment, or such like. Over many trials the algorithm can gradually tune the parameters of the graph to be able to predict inputs that will result in a positive outcome. The various approaches and algorithms for learning a graph will be known to a person skilled in the art of machine learning.

According to an exemplary application of the techniques disclosed herein, each worker thread is programmed to perform the computations associated with a respective individual one of the nodes 102 in a machine intelligence graph. In this case at least some of the edges 104 between nodes 102 correspond to the exchanges of data between threads, and some may involve exchanges between tiles. Furthermore, the individual exit states of the worker threads are used by the programmer to represent whether or not the respective node 102 has satisfied its respective condition for convergence of the parameter(s) of that node, i.e. has the error in the parameter or parameters fallen within the acceptable level or region in error space. For instance, this is one example use of the embodiments where each of the individual exit states is an individual bit and the aggregated exit state is an AND of the individual exit states (or equivalently an OR if 0 is taken to be positive); or where the aggregated exit state is a trinary value representing whether the individual exit states were all true, all false or mixed. Thus, by examining a single register value in the exit state register 38, the program can determine whether the graph as whole, or at least a sub-region of the graph, has converged to an acceptable degree.

As another variant of this, embodiments may be used where the aggregation takes the form of a statistical aggregation of individual confidence values. In this case each individual exit state represents a confidence (e.g. as a percentage) that the parameters of the node represented by the respective thread have reached an acceptable degree of error. The aggregated exit state can then be used to determine an overall degree of confidence as to whether the graph, or a subregion of the graph, has converged to an acceptable degree.

In the case of a multi-tile arrangement 6, each tile runs a subgraph of the graph. Each subgraph comprises a supervisor subprogram comprising one or more supervisor threads, and a set of worker threads in which some or all of the workers may take the form of codelets.

It will be appreciated that the above embodiments have been described by way of example only.

For instance, in alternative scenarios, the scope of the present disclosure is not limited to a time-deterministic internal interconnect or a non-time-deterministic external interconnect. It would also be possible to make the divide between the time-deterministic and non-time-deterministic realms in other ways. For instance it is not excluded to extend the time-deterministic domain across multiple chips 2, with different multi-chip time deterministic domains being connected by a non-time-deterministic interconnect (e.g. the different multi-chip time-deterministic domains being implemented on different cards or server chassis). Or as another example, different time-deterministic domains could be implemented on a given chip 2, with a non-time-deterministic on-chip interconnect being provided between such domains. Or communications between all tiles 4 or modules could even be non-time-deterministic, with no time-deterministic exchanges at all.

Where a time-deterministic interconnect is used, the implementation is not limited to use of an inter-tile delay look up table. Instead for example an analytical formula could be used to determine the inter-tile delay. Further, the inter-tile delay and the send and receive timings are not limited to being set by the compiler. E.g. alternatively they could be arranged manually by the programmer.

Further, the disclosed exchange mechanism is not limited to use with a non-time-deterministic exchanges. Even in a system where all tiles 4, chips 2 or other such processing modules can exchange data with one another in a time-deterministic manner, the disclosed exchange mechanism may still be desirable to enable exchange without either requiring a rendezvous or postbox mechanism or the program having to know the exact timings of the exchange. Though that is disclosed for the internal interconnect 34 in embodiments herein, that requires careful predetermination of the program timing which may not necessarily be desirable for all possible use cases.

Moreover, the applicability of the disclosed exchange mechanism is not limited to BSP. While it provides a particularly useful mechanism for separating between the exchange phase and the compute phase in a BSP superstep, more generally it can also be used in any scenario where it is desired to synchronize the next actions of a processor module with the receipt of some predetermined or specified amount of data.

On a given tile or processor, the implementation is not limited to the above-described architecture in which a separate context is provided for the supervisor thread, or in which the supervisor thread runs in a slot and then relinquishes its slot to a worker. The supervisor could instead use a general purpose context. Or in another arrangement for example, the supervisor may run in its own dedicated slot. Further, the implementation is not limited to specific one of the threads even having a supervisor role, or indeed to multi-threading at all. The techniques disclosed herein may even be used in scenarios where one, some or all of the tiles on one, some or all of the chips employ non-multithreaded execution.

Where used, the applicability of a host sync proxy is not limited to systems allowing selection between different sync groupings. Even in a system having only a single sync domain (single group of tiles 4 across which a barrier synchronization is performed), it would still be beneficial to be able to reduce the amount of host interaction by setting a certain number of barriers that the tiles 4 are allowed to pass through before deferring to the host 93.

Further, though embodiments have been exemplified in terms of a PCI interface between cards or with the host 93, this is not limiting and other types of interface could be used, e.g. Ethernet.

Where multithreaded tiles are used, the terms "supervisor" and "worker" do not necessarily have to imply specific responsibilities expect where otherwise explicitly stated, and particularly are do not in themselves necessarily limit to the above-described scheme in which a supervisor thread relinquishes its time slot to a worker, and so forth. In general, worker thread may refer to any thread to which some computational task is allocated. The supervisor may represent any kind of overseeing or coordinating thread responsible for actions such as: assigning workers to barrel slots (execution channels), and/or performing barrier synchronizations between multiple threads, and/or performing any control-flow operation (such as a branch) in dependence on the outcome of more than one thread.

Where reference is made to a sequence of interleaved time slots, or the like, this does not necessarily imply that the sequence referred to makes up all possible or available slots. For instance, the sequence in question could be all possible slots or only those currently active. It is not necessarily precluded that there may be other potential slots that are not currently included in the scheduled sequence.

The term tile as used herein does not necessarily limit to any particular topography or the like, and in general may refer to any modular unit of processing resource comprising a processing unit 10 and corresponding memory 11, in an array of like modules, typically on the same chip (same die).

Furthermore, where reference is made herein to performing a synchronization or an aggregation between a group of tiles, or a plurality of tiles or the like, this does not necessarily have to refer to all tile on the chip or all tiles in the system unless explicitly stated. E.g. the SYNC and EXIT instructions could be configured to perform the synchronization and aggregation only in relation to a certain subset of tiles 4 on a given chip and/or only a subset of chips 2 in a given system; whilst some other tiles 4 on a given chip, and/or some other chips in a given system, may not be involved in a given BSP group, and could even be being used for some completely separate set of tasks unrelated to the computation being performed by the group at hand.

Further, the above-described synchronization schemes do not exclude the involvement, in embodiments, of external resources that are not processors such as one or more network cards, storage devices and/or FPGAs. For instance, some tiles may elect to engage in data transfers with an external system where these transfers form the computational burden of that tile. In this case the transfers should be completed before the next barrier. In some cases the exit state of the tile may depend on a result of the communication with the external resource, and this the resource may vicariously influence the exit state. Alternatively or additionally, resources other than multi-tile processors, e.g. the host or one or more FPGAs, could be incorporated into the synchronization network itself. That is to say, a sync signal such as a Sync_req is required from this/these additional resources in order for the barrier synchronization to be satisfied and the tiles to proceed to the next exchange phase. Further, in embodiments the aggregated global exit state may include in the aggregation an exit state of the external resource, e.g. from an FPGA.

Also, while certain modes of SYNC instruction have been described above, the scope of the present disclosure more generally is not limited to such modes. For instance, the list of modes given above is not necessarily exhaustive. Or in other embodiments, the SYNC instruction may have fewer modes, e.g. the SYNC need not support different hierarchical levels of external sync, or need not distinguish between on-chip and inter-chip syncs (i.e. in an inter-tile mode, always acts in relation to all tiles regardless of whether on chip or off chip).

In further variations, the SYNC instruction could take a greater number of possible modes to accommodate a greater granularity or range of hierarchical sync zones 91, 92; or simply a different set of modes to accommodate different division of the system into hierarchical zones. For instance, as well as allowing selection between internal (on-chip) and external (off-chip) synchronization (or even as an alternative to this), the modes of the SYNC instruction may be configured to recognize other physical breakpoints further out beyond one chip (e.g. one IC package, one card, one box of cards etc.). Or even if no dedicated SYNC instruction is used, such divisions may be implemented by the programmer or compiler using general purpose code. So in embodiments, one of the hierarchical sync zones (e.g. one of the modes of the SYNC instruction) may consist of all the tiles on all the chips on the same IC package (but none of the tiles or chips beyond that). Alternatively or additionally, one of the hierarchical sync zones (e.g. again one of the modes of the SYNC instruction) may consist of all the tiles on all the chips on the same card (but none of the tiles, chips or packages beyond that). As another alternative or additional example, one of the hierarchical sync zones (e.g. again another possible mode of the SYNC instruction) may consist of all the tiles on all the chips on all the cards in the same physical box, e.g. same chassis (but none of the tiles, chips or boxes beyond that). This would be advantageous because communication between IC packages, cards and boxes will tend to incur an even greater penalty than just between chips (dies) in the same package.

Furthermore, the sync zones are not limited to being hierarchical (i.e. one nested in another), and in other embodiments the selectable sync zones may consist of or include one or more non-hierarchical groups (all tiles of that group not nested within a single other selectable group).

In yet further variants, the synchronization is not limited to being performed using dedicated SYNC instructions, nor the EXIT instructions. In other cases the synchronization functionality could be achieved using general purpose code. Further, where the SYNC instruction and/or EXIT instructions are used, they do not necessarily have to have the described function of aggregating exit states.

Other applications and variants of the disclosed techniques may become apparent to a person skilled in the art once given the disclosure herein. The scope of the present disclosure is not limited by the described embodiments but only by the accompanying claims.

What is claimed is:

1. A processor comprising:
   an arrangement of multiple tiles on the same chip, each tile comprising its own separate respective processing unit and memory including program memory and data memory,
   wherein separate portions of program code are arranged to run in parallel in different ones of the tiles;
   an on-chip interconnect arranged to enable the code run on the different tiles to communicate between tiles; and
   an external interconnect comprising a non-time-deterministic mechanism implemented in dedicated hardware logic for communicating data off-chip, whereby data is sent over the external interconnect in the form of packets, each packet having a header in which a destination address is present, and whereby communication of packets over the external interconnect is non-time-deterministic;
   wherein the external interconnect comprises an external exchange block configured to provide flow control and queuing of the packets;
   wherein one of the tiles is nominated by a compiler of the code to send an external exchange request message to the exchange block, the external exchange request message comprising one or more control packets indicating which of the tiles have data packets to send to a destination on another chip; and
   wherein the exchange block is configured to perform said flow control by: A) sending an exchange-on control packet to a first of the tiles indicated in the external exchange request message as having data to send externally, to cause the first tile to start sending packets to their destinations via the external interconnect, being queued in a queue of the exchange block; and then B) once this tile has sent its last data packet, sending an exchange-off control packet to this tile to cause it to stop sending packets, and sending another exchange-on control packet to the next tile indicated in the exchange request message as having data packets to send;
   wherein the exchange block is configured so as, if at any time the exchange block is unable to continue sending packets over the external interconnect, the exchange block sends an exchange-off control packet to the sending tile before the exchange block's queue overflows; and once the congestion is cleared and the exchange block has sufficient space in its queue it will send an exchange-on control packet to the sending tile allowing it to continue transmitting its content.

2. The processor of claim 1, wherein the destination of at least some of the packets is another tile or tiles on another chip.

3. The processor of claim 1, wherein the destination of at least some of the packets is a host subsystem comprising a host CPU, and said processor is arranged as a work accelerator to perform work allocated by the host.

4. The processor of claim 1, wherein the destination of at least some of the packets is a storage device.

5. The processor of claim 1, wherein the internal interconnect is a time-deterministic interconnect, the communication of data between tiles on chip being time-deterministic.

6. The processor of claim 1, wherein at a physical layer the external interconnect mechanism is lossy, but at the transaction layer the mechanism is not lossy due to an architecture whereby, if a packet is not acknowledged, it will be resent automatically by hardware in the external interconnect.

7. The processor of claim 1, wherein the external interconnect takes the form of a network and the header further comprises information for routing purposes.

8. The processor of claim 1, wherein the external interconnect is configured to use clock-data-recovery technology to infer a clock from a received data stream having sufficient data signal transitions to maintain a bit-lock.

9. The processor of claim 1, wherein the external interface is configured to send the packets to the destination or destination via a PCI, PCIe or Ethernet bus or network between the external interface and the destination or destinations.

10. The processor of claim 1, wherein a group of some or all of the tiles modules is programmed to operate in a series of bulk synchronous parallel, BSP, supersteps, whereby in each superstep the group performs:
   a compute phase in which the tiles in the group performs computations but does not exchange results of the computations outside the chip, and then
   an exchange phase in which at least some of the tiles in the group exchange the results of one or more of the computations with the off-chip destination or destinations, said at least some of the tiles being those indicated in the exchange request; and
   the group is synchronized by a barrier synchronization between each current superstep in the series and the next, whereby each tile in the group waits for all in the group to complete the compute phase of the current superstep before advancing to the exchange phase of the next superstep.

11. The processor of claim 10, wherein the on-chip and/or external interconnect comprises hardware logic configured to conduct said barrier synchronization by: receiving a sync request from each of the tiles in the group, and issuing a sync acknowledgement on condition that the sync requests are received from all of the group.

12. The processor of claim 11, wherein the respective processing unit on each of the tiles is configured to execute instructions from a predefined instruction set; and wherein the instruction set of some or all of the tiles comprises a sync instruction which causes the tile on which it is executed to send the sync request.

13. The processor of claim 1, wherein the exchange block comprises a plurality of exchange block contexts, each configured to implement an instance of said flow control mechanism for a different respective subset of the tiles.

14. The processor of claim 1, comprising at least twenty of said tiles.

15. The processor of claim 1, arranged to perform said sending without using a DMA engine, wherein a subset of the tiles are nominated by the compiler to act as I/O tiles to perform said sending of data to the off-chip destination or destinations and/or to read data from the off-chip destination or destinations, said subset being the tiles indicated in the exchange request message.

16. The processor of claim 15, wherein the external interface is configured to send the packets to the destination or destinations via a connection between the external interface and the destination or destinations, said connection having a first bandwidth for sending the packets; and wherein each of the tiles has a second bandwidth for sending the packets, wherein the number of tiles nominated as I/O tiles is at least the first bandwidth divided by the second bandwidth rounded up or down to the nearest whole number.

17. A system comprising the processor of claim 1, and the off-chip destination or destinations of the packets.

18. A method of operating the processor of claim 1, the method comprising:
running the compiler on a computer in order to compile the code, wherein the compilation comprises the compiler nominating which of the tiles is to send the exchange request message; and
running the compiled code on the processor, thereby causing the nominated tile to send the exchange request message to the exchange block to cause the exchange block to perform said queuing and flow control, and causing the tiles indicated in the exchange request message to perform the sending of their packets.

19. The method of claim 18, wherein:
if at any time the exchange block is unable to continue sending packets over the external interconnect, the exchange block sends an exchange-off control packet to the sending tile before the exchange block's queue overflows; and once the congestion is cleared and the exchange block has sufficient space in its queue it sends an exchange-on control packet to the sending tile allowing it to continue transmitting its content; and
the congestion is due, at least in part, to over subscription of the external interconnect.

20. The method of claim 18, wherein:
if at any time the exchange block is unable to continue sending packets over the external interconnect, the exchange block sends an exchange-off control packet to the sending tile before the exchange block's queue overflows; and once the congestion is cleared and the exchange block has sufficient space in its queue it sends an exchange-on control packet to the sending tile allowing it to continue transmitting its content; and
the congestion is due, at least in part, to previous packet loss and re-transmission in the external interconnect.

21. The method of claim 18, wherein: said sending is performed without using a DMA engine, wherein a subset of the tiles are nominated by the compiler to act as I/O tiles to perform said sending of data to the off-chip destination or destinations and/or to read data from the off-chip destination or destinations, said subset being the tiles indicated in the exchange request message; and said compilation comprises the compiler nominating which of the tiles are the I/O tiles.

* * * * *